(12) United States Patent
Thi et al.

(10) Patent No.: US 12,100,218 B1
(45) Date of Patent: Sep. 24, 2024

(54) ASSOCIATING CARTS AND USERS IN HYBRID ENVIRONMENTS

(71) Applicant: Amazon Technologies, Inc., Seattle, WA (US)

(72) Inventors: Hue Tuan Thi, Seattle, WA (US); Xiaoxia Shi, Seattle, WA (US); Jiajun Zhao, Kirkland, WA (US); Yuzhou Feng, Mountlake Terrace, WA (US); Ejaz Ahmed, Needham, MA (US); Chris Broaddus, Sammamish, WA (US); Longlong Zhu, Bellevue, WA (US); Austen Groener, Bolton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 418 days.

(21) Appl. No.: 17/486,658

(22) Filed: Sep. 27, 2021

(51) Int. Cl.
*G06T 7/70* (2017.01)
*G06F 16/27* (2019.01)
*G06F 18/22* (2023.01)
*G06F 18/24* (2023.01)
*G06Q 10/087* (2023.01)
*G06T 7/292* (2017.01)
*G06V 10/22* (2022.01)
*G06V 20/52* (2022.01)
*G06V 40/20* (2022.01)
*H04N 23/90* (2023.01)
*G06Q 20/18* (2012.01)
(Continued)

(52) U.S. Cl.
CPC .............. *G06V 20/53* (2022.01); *G06F 16/27* (2019.01); *G06F 18/22* (2023.01); *G06F 18/24* (2023.01); *G06Q 10/087* (2013.01); *G06T 7/292* (2017.01); *G06T 7/70* (2017.01); *G06V 10/225* (2022.01); *G06V 40/20* (2022.01); *H04N 23/90* (2023.01); *G06Q 20/18* (2013.01); *G06Q 30/0633* (2013.01); *G06T 2207/30196* (2013.01); *G06T 2207/30232* (2013.01); *G07C 9/38* (2020.01)

(58) Field of Classification Search
CPC ...... G06V 20/53; G06V 10/225; G06V 40/20; G06F 16/27; G06F 18/22; G06F 18/24; G06Q 10/087; G06Q 20/18; G06Q 30/0633; G06T 7/292; G06T 7/70; G06T 2207/30196; G06T 2207/30232; H04N 23/90; G07C 9/38
USPC ....................................................... 382/103
See application file for complete search history.

(56) References Cited

U.S. PATENT DOCUMENTS 9,117,106 B2    8/2015  Dedeoglu et al.
9,235,928 B2    1/2016  Medioni et al.
(Continued)

*Primary Examiner* — Ali Bayat
(74) *Attorney, Agent, or Firm* — Lee & Hayes, P.C.

(57) ABSTRACT

This disclosure describes, in part, systems for enabling physical retail stores and other facilities to implement both automated- and manual-checkout techniques for customers of the stores and/or facilities. For example, the described systems may enable a retail store to implement technology where users are able to pick items from shelves and other inventory locations and exit the store without performing manual checkout of the items, as well as technology to allow users to pay for their items using point-of-sale (POS) and/or other manual-checkout techniques. The systems described herein also generate associations between users and carts within the stores to prevent fraudulent transactions within these hybrid environments.

22 Claims, 14 Drawing Sheets

(51) Int. Cl.
    *G06Q 30/0601*     (2023.01)
    *G07C 9/38*     (2020.01)

(56) References Cited

U.S. PATENT DOCUMENTS

| | | |
|---|---|---|
| 9,473,747 B2 | 10/2016 | Kobres et al. |
| 10,127,438 B1 | 11/2018 | Fisher et al. |
| 10,133,933 B1 | 11/2018 | Fisher et al. |
| 2006/0147087 A1* | 7/2006 | Goncalves ............. G06V 10/25 382/173 |
| 2013/0284806 A1 | 10/2013 | Margalit |
| 2014/0129395 A1* | 5/2014 | Groenovelt .......... G06Q 10/087 705/28 |
| 2019/0215424 A1* | 7/2019 | Adato ....................... G06T 7/55 |
| 2019/0382203 A1* | 12/2019 | Middelberg ............ A47B 49/00 |
| 2021/0067746 A1* | 3/2021 | Yones .................... H04N 23/65 |
| 2022/0114868 A1* | 4/2022 | Bronicki ............. G07G 1/0063 |

\* cited by examiner

ASSOCIATING CARTS AND USERS IN HYBRID ENVIRONMENTS

BACKGROUND

Traditional physical stores maintain an inventory of items in customer-accessible areas such that customers can pick items from the inventory and take them to traditional checkout stand for purchase, rental, and so forth. In other instances, meanwhile, retail environments may include sensors to generate information about events occurring in these facilities such that customers can pick items and automatically pay for the items upon exiting the store and without engaging in a manual payment process. While these hybrid retail environments enable different shopping experiences for users, these environments may also benefit from techniques to direct customers to the traditional check-out stands when appropriate.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
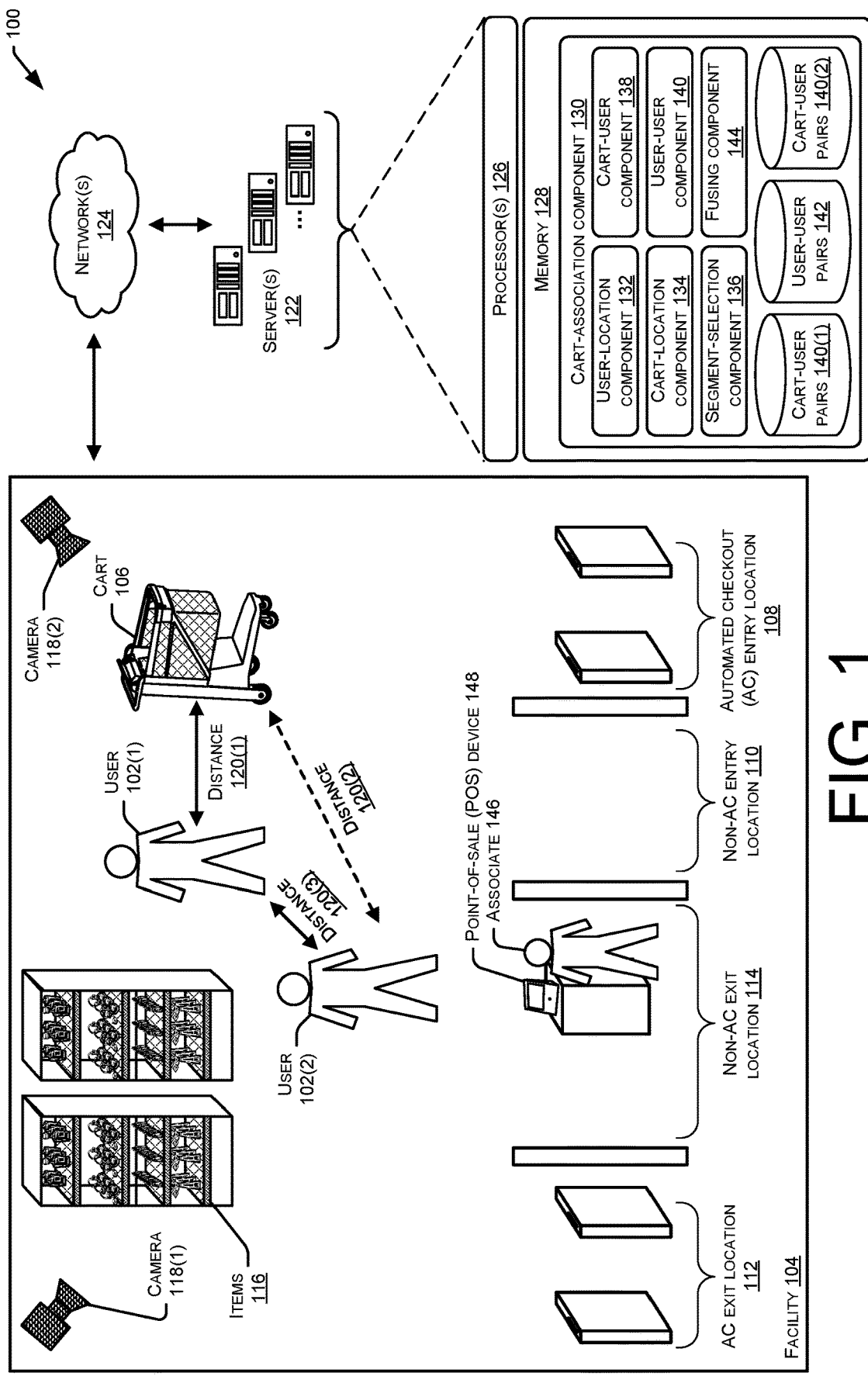
FIG. 1 illustrates an example facility that is associated with a system for enabling automated checkout (AC) techniques to allow users to enter the facility, pick one or more items, and exit the facility without performing a manual checkout of the items. To do so, the system coupled to the environment may identify an entering user and charge an account associated with the user for a cost of the picked items upon exit of the user. This example facility also includes a system to enable a user to acquire and pay for items via a traditional checkout system. Given this "hybrid" environment, the illustrated system may perform techniques to associate users to respective mobile carts to direct these users to an exit associated with a traditional checkout system when appropriate.

This disclosure describes, in part, systems for enabling physical retail stores and other facilities to implement both automated-and manual-checkout techniques for customers of the stores and/or facilities. For example, the described systems may enable a retail store to implement technology where users are able to pick items from shelves and other inventory locations and exit the store without performing manual checkout of the items, as well as technology to allow users to pay for their items using point-of-sale (POS) and/or other manual-checkout techniques. The systems described herein thus enable hybrid retail facilities, as opposed to a retail facility that is either entirely traditional or entirely enabled for automated checkout. Further, the techniques described herein may create respective associations between user(s) and mobile cart(s) operating within such hybrid retail facilities for determining whether a respective user is eligible to exit through an automated-checkout (AC) enabled exit or whether the user and his or her items are to exit through a manual-checkout exit.

In some instances, these hybrid retail environments include one or more sensors configured to generate sensor data indicative of events that occur with respect to the items housed thereupon. For example, these sensors may generate sensor data indicative of a user picking an item from an inventory location, returning the item to the inventory location, and/or the like. These sensors may include overhead cameras, in-shelf cameras, weight sensors, and/or any other type of sensor configured to generate sensor data indicative of user interactions with the items. In some instances, these retail facilities include these sensors throughout the environment, while in other instances the facilities include the sensors in a portion of the environment.

In addition, an example hybrid retail facility may include one or more entry locations for entering the facility and one or more exit locations for exiting the facility. For example, the facility may include a first entry location at which an entering user provides information for identifying an account of the user, and a second entry location at which users enter without providing identifying information. For example, the first entry location may include a scanner or other imaging device at which an entering user scans or otherwise provides a unique code associated with the account of the user, such as a code displayed on a mobile device of the user. Or, the first entry location may include a microphone, camera, or other sensor that generates sensor information at the request of the user for use in identifying the account of the user. In still other instances, the first entry location may include an input device for reading information from a payment card of a user, such as a credit card, debit card, prepaid card, etc. For example, the first entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. The second entry location, meanwhile, may resemble a traditional retail facility entry location to allow users to shop or otherwise interact with items at the retail facility without needing to provide information for identifying user accounts.

Similarly, the facility may include a first exit location where an exiting user provides information for identifying an account of the exiting user, and a second exit location at which users exit without providing identifying information. The first exit location may include, similar to the first entry location, a scanner or other imaging device at which the exiting user scans or otherwise provides a unique code associated with the account of the user, such as the code displayed on the mobile device of the user. Or, the first exit location may include a microphone, camera, or other sensor that generates sensor data at the request of the user for use in identifying the account of the exiting user. In still other instances, the first exit location may include an input device for reading information from a payment card of a user, such as a credit card, debit card, prepaid card, etc. For example, the first exit location may include a scanner or camera that scans or captures an image of a payment card, a card reader that receives information from a payment card via a swipe, dip, tap, or the like, or may include any other type of input device configured to receive payment or account information. The second exit location, meanwhile, may resemble a traditional exit location at a retail facility, including an associate of the facility operating a POS device to manually checkout the exiting user, a self-checkout station, or the like.

Within this example facility, a user may choose to enter the facility using the first, AC-enabled entry location, or may choose to enter the facility using the second, non-AC-enabled entry location. If the user enters through the first entry location and provides information identifying an account of the user, then a system associated with the facility may generate a record indicating the presence of the user at the facility. The record may store an indication of the identity of the user, as well as an indication of whether the user is currently eligible to exit the facility (with items procured by the user) via the AC exit location, or whether the user is only eligible to exit (with the items) via the non-AC exit location, such that the associate of the facility may use the POS device to manually checkout the user. Of course, while this example describes an associate using a POS device to perform the manual checkout, it is to be appreciated that the facility may include self-checkout kiosks or any other technology for enabling manual checkout of the items within the facility and/or proximate the non-AC-enabled exit location.

In addition, sensor data generated from sensors at the facility may be used to determine current positioning of the user, which may also be stored in association with the record of the user. For example, overhead cameras, floor weight sensors, and/or the like may be used to maintain, in the record and at the knowledge and request/consent of the user, the current location of an identifier of the user within the facility. It is to be appreciated that this identifier may correspond to information that does not explicitly include personal identification information of the user. For instance, the identifier may correspond to a unique (relative to other users in the facility) alphanumeric string, such as XYZ123 or the like. Further, this sensor data (e.g., image data) may be used to locate the identifier of user as the user navigates through the store. If the user interacts within one or more items housed at an AC-enabled inventory location, the system may generate data indicative of the event. This data may comprise result data, indicating a result of the interaction between the user and the item. In some instances, this result data indicates an action taken (e.g., a pick of an item, a return of an item, etc.), an identity of the item acted upon (e.g., a bottle of ketchup, a pair of jeans, etc.), a quantity of the item involved, a location of the item (e.g., aisle, shelf, lane, etc.), and/or the like.

In some instances, the system may generate the result data along with a confidence level indicating a confidence associated with the result data. If the confidence level associated with the result data is greater than a threshold confidence level, then the result data may be associated with an account of the user (e.g., a virtual cart of the user). For example, if the system determines, with a confidence level that is greater than the threshold, that the user picked one bottle of ketchup from an AC-enabled inventory location, then one bottle of ketchup (and its corresponding cost) may be added to the virtual cart of the user. Further, the record associated with the user may continue to indicate that the user is eligible to exit through the AC-enabled inventory location, given that the user is identified and the event that the user performed was determined to be associated with high-confidence result data.

If, however, the confidence level associated with the result data is less than the threshold, then the system may perform one or more additional techniques for determining the result of the event. For example, the system may send sensor data (e.g., image data, weight-sensor data, etc.) to one or more human users for analysis. Further, given that the event is not associated with high-confidence result data, the record associated with the user may be updated to indicate that the user is not eligible to exit through the AC exit location. If, however, the result data is updated to indicate a high-confidence result (e.g., based on the human analysis, etc.), then the record may again be updated to indicate that the user is eligible to exit through the AC exit location, given that the user is identified and associated with high-confidence result data.

In instances where a user is not eligible to exit through the AC exit location (e.g., because the user is associated with a low-confidence event, because the user acquired an item from a non-AC-enabled inventory location, etc.), the system may generate notification data indicating at least one of that the user is ineligible to exit through the AC exit location or that the user is eligible to exit through the non-AC exit location (or otherwise needs to perform a manual checkout of at least some of the items procured by the user). In addition, the system may output the notification data to the user. This notification data may comprise visual data, audible data, tactile data, and/or the like. In some instances, the notification data may be sent to a mobile device of the user for display on the mobile device. In addition, or in the alternative, the notification data may be presented on an AC exit gate, in response to the user attempting to exit through the AC exit gate, moving near the AC exit gate, or the like. Of course, while the techniques described herein discuss the user being ineligible to exit through the AC exit gate in some circumstances, it is to be appreciated that the user may choose to disregard this instruction and freely exit through any exit location of the facility. In these instances, the user, who may be unidentified or whose items may be unidentified at that moment, may simply not be charged for one or more of the procured items.

If the user is not eligible to exit through the AC exit location, the user may choose to perform a manual checkout of the items at the non-AC exit location. For instance, the user may provide one or more of the items (e.g., the items not currently added to the virtual cart of the user) to an associate of the facility. The associate may use a POS device or the like to identify the items. Thereafter, the user may provide a payment instrument to the associate and/or the POS device for purchasing or otherwise acquiring the items, or the user may thereafter provide the unique code discussed above, which may be associated with an account of the user for purchasing the items.

In instances where the user is eligible to exit through the AC exit location, meanwhile, upon finishing his or her shopping, the user may approach the AC exit location and, in some instances, scan or otherwise provide identifying information to enable the system to identify the exiting user. After scanning his or her unique code at the AC exit gate, for instance, the user may exit the facility. The system, meanwhile, may thereafter charge an account of the identified exiting user for a cost of the items procured by the user within the facility. Of course, while the above example describes the user scanning a unique code (e.g., via a mobile device of the user), it is to be appreciated that the exiting user may be identified based on other sensor data, such as image data, voice data, or the like.

The above-described environment thus provides a hybrid retail environment in which users may choose to acquire items and pay for them via a traditional checkout process, or acquire items and exit the store to trigger an AC-checkout experience in which a prestored payment instrument of the user is charged for the cost of any items that the user has acquired within the store. In the latter instances, the system may analyze the sensor data described above in order to identify which items the user has acquired, a quantity of these items, and so forth. In some instances, however, the system may additionally analyze the sensor data to generate associations between mobile carts or other item carriers (e.g., baskets, etc.) used in the store and users within the store. In addition, the system may also generate associations between users, which may in turn be used to generate associations between a mobile cart and one or more users. In some examples, the system may generate these associations to, for instance, lessen a number of fraudulent transactions that occur within the hybrid retail environment.

For instance, envision a scenario where a first user enters the facility via the AC-enabled entry location (e.g., by scanning an identifier or the like), while a second user enters the environment through a traditional, non-AC-enabled entry location. Given that the first user has entered the environment through the AC-enabled entry location, the system may analyze image data generated while the user is in the store to identify items acquired by the first user and placed into his or her cart. Further, given that the second user entered via the non-AC-enabled entry location, the system may refrain from analyzing sensor data indicative of the second user acquiring or otherwise interacting with the items. Thus, if the second user were to pick items from the inventory locations and thereafter hand the items to the first user, the system might not add these items to a virtual cart of the first user, given that they were originally acquired from the inventory locations by the second user. Further, if the first user were to exit the retail facility via the AC-enabled exit location, the system would not "know." about these items and, thus, neither the first user nor the second user may be charged for these items.

In another example, envision that a user enters the facility through the non-AC-enabled entry location before loading items into a cart or other item carrier. Envision further that the first user then exits the facility via the non-AC-enabled exit location. Given that this user has not entered through the non-AC-enabled entry location, the system does not "know" about the items in the cart and, thus, the system may refrain from charging the payment instrument of the user for the cost of the items in the cart. However, envision also that the same user then re-enters the environment through the AC-enabled entry location and travels to the cart that includes the previously loaded items and exits the facility via the AC-enabled exit location. Again, because the system does not know about the items having been placed into the cart, the user would be able to exit the facility without paying for the items previously loaded into the cart.

Described below, however, are techniques to associate users to carts and users to other users to avoid such fraudulent transactions in hybrid retail environments. To do so, the techniques described herein analyze sensor data generated in an environment to determine which user(s) are associated with which cart(s) (or other item carriers) such that a virtual cart (e.g., listing of items) associated with a particular cart may be attributed to each of these user(s). For instance, these associations may be used to determine when to charge a user for cost of items in a particular cart, when to redirect a user from an AC exit location to a non-AC-exit location, and so forth.

In one example, the techniques may be configured to analyze image data generated by one or more cameras in an environment to identify: (1) initial associations between user(s) and cart(s), and (2) associations between users. This information may then be combined to identify final associations between user(s) and cart(s). For instance, the techniques may analyze image data to determine: (1) that "user A" is associated with "Cart 123", and that (2) "user A" is associated with "user B". This information may then be combined to determine that "user A" is associated with "Cart 123" and that "user B" is associated with "Cart 123".

In order to make these determinations, the techniques described herein may perform a series of operations, which may include: (1) selecting image data to analyze: (2) identifying cart(s) from the selected image data: (3) determining initial cart-user pairs from the image data: (4) determining user-user pairs from the image data, and (5) determining final cart-user pairs from the initial cart-user pairs and the user-user pairs.

In some instances, the techniques may begin by selecting image data to analyze, which may comprise determining one or more time intervals to analyze and thereafter acquiring image data generated in the environment at the selected time intervals. For instance, the techniques may determine to select a time interval to analyze every "N" units of time, such as a five-second time interval every fifteen seconds. To provide an example, envision that a shopping session of a first user, "user A", begins at 9:00:00 am PST. The techniques may select a five-second time interval to analyze every fifteen seconds, meaning that a single time interval may be selected from: (i) 9:00:00-9:00:05 am PST: (ii) 9:00:05-9:00:10 am PST, and (iii) 9:00:10-9:00:15 am PST. In addition, a single time interval may be selected from: (i) 9:00:15-9:00:20 am PST: (ii) 9:00:20-9:00:25 am PST, and (iii) 9:00:25-9:00:30 am PST, and so forth.

Using the first selection as an example, the techniques may use one or more criteria for selecting a time interval. In one example, the techniques may determine, for a particular user, how far the user moved within each of the three example time intervals and may select the time interval corresponding to the largest distance. For instance, if the user is determined to have moved 3.5 meters in the first time interval, 2 meters in the second time interval, and 1 meter in the third time interval, the techniques may select the first time interval to analyze. In some instances, the techniques may determine this information from a locating component of a system that is configured to locate user identifiers through the facility after the respective users enter through the AC-entry location. In other instances, the locating service may have analyzed image data generated from overhead or other camera(s) in the facility to determine the locations of the user(s) over time and, thus, to determine the distance traveled by a particular user during particular time intervals. Further, while this example describes selecting a time interval for a particular time interval based on distance traveled by the user, it is to be appreciated that other examples may additionally or alternatively use other criteria to make this selection.

After selecting a time interval, such as 9:00:00 am PST through 9:00:05 am PST, the techniques may determine which camera(s) in the facility have a respective field-of-view (FOV) that includes the user during at least a portion of this time interval. For instance, the techniques may, again, use information from the locating service to determine a location of the particular user during this time interval and may determine which camera(s) in the facility have respective FOVs that include these location(s). The techniques may then acquire the image data for this time interval from these camera(s). To provide an example, envision that three cameras are determined to have a respective FOV that includes a location of the user during the selected five-second interval, and that these cameras operate at thirty frames-per-second (FPS). Thus, the techniques may acquire 450 frames (150 frames from each camera corresponding to the five-second interval).

After acquiring the image data corresponding to the selected time interval, the techniques may proceed to identify mobile cart(s) from the image data. It is to be appreciated that while this example describes identifying a mobile shopping cart, the techniques may apply equally to identifying other item carriers, such as baskets, bags, or the like.

In some instances, the techniques may analyze the image data, such as the example 150 frames to identify visual indicia associated with the cart and that uniquely identifies the cart relative to other carts in the facility. For instance, each cart in the facility may include a barcode, a QR code, an alphanumeric string, or the like imprinted on a portion of the cart, such as on an upwards-facing portion of the cart that is visible to the overhead cameras. The techniques may perform computer-vision techniques on each frame to identify, in the frame, the identifier associated with the cart. In some instances, the techniques may use a first trained classifier to identify a bounding box (e.g., a portion) of the frame that includes the barcode or other visual indicia and may input this bounding box to one or more second trained classifiers configured to identify the barcode or alphanumeric string from the bounding box.

After identifying the barcode or other visual indicia for a cart within some or all of the 150 frames for the selected time interval, the techniques may determine a trajectory of the cart during the time interval. For instance, the techniques may determine a respective location of the cart in the facility at each of multiple times during the five-second time interval. In some instance, given that the image data is generated by overhead cameras, the respective locations of the of the cart may be determined and stored in two-space. Thus, if a location of the cart was identified at twenty discrete times during the example five-second interval, the techniques may store an association between cart location and time as follows: $(T_1, X_1, Y_1), (T_2, X_2, Y_2), \ldots, (T_{20}, X_{20}, Y_{20})$.

After identifying the trajectory of a cart over the time interval (and potentially multiple time intervals), the techniques may determine one or more initial user-cart pairs based at least in part on the location of the cart and respective location(s) of users within the facility. For instance, the techniques may determine, for the time interval, each user determined to be within the facility during the corresponding time interval. After doing so, the techniques may determine, from the locating service, a respective location of each user during different times within the time interval. For instance, the techniques may determine a location of each user at each time of the twenty times at which at which the cart is associated with a particular location in the environment during the time interval. After identifying these respective locations, the techniques may compare the location of the respective user with the location of the cart at the first time, the location of the respective user with the location of the cart at the second time, and so forth. That is, at time $T_1$, the techniques may determine a difference in distance between the location of the user at $T_1$ and the location of the cart at $T_1$, a difference in distance between the location of the user at $T_2$ and the location of the cart at $T_2$, and so forth. After calculating these differences (in this example, twenty differences), the techniques may calculate a mean difference in distance for this particular user and the cart and may compare this mean distance to a threshold distance, such as one meter, five meters, or the like.

If the mean distance is less than the threshold distance (meaning that the cart and the user were relatively close to one another during the time interval), then the techniques may update a count indicating a number of times that this particular user was near this particular cart for a time interval. If, for instance, this was the first time that this determination was made, the techniques may update a count between the particular user and the particular cart from zero to one. If, for instance, this was the fifth time that this determination was made, the techniques may update a count between the particular user and the particular cart from four to five. If, however, the mean distance is not less than the threshold distance (meaning that the particular user and the cart were not near each other during the time interval), then the techniques may refrain from updating the corresponding count data.

After updating this count, the techniques may compare the current count value to a count-value threshold to determine whether it is greater than a threshold, such as five, ten, or the like. If the count value is greater than the count-value threshold, then the techniques may store an association between the identifier associated with the user and the identifier associated with the cart. Each stored association may represent a cart-user pair. Further, given that this analysis is performed on a per-user and per-cart basis, in some instances a cart may be associated with multiple users. Likewise, in some instances a user may be associated with multiple carts. Each of the determined cart-user pairs may be inputted to a fusing component, which may determine and output final cart-user pairs as discussed in detail below.

In addition to generating and storing the initial cart-user pairs, the techniques may also determine user-user pairs. That is, the techniques may determine two (or more) users that appear, from the image data, to be shopping together and, thus, should be associated with one another as it pertains to this shopping session. In some instances, the techniques may make this determination by identifying users that are proximate to one another within the facility as they move throughout the facility.

In some instances, the techniques may analyze a location of a first user relative to each other user in the facility during the shopping session of the first user to determine whether one or more other users are to be associated with the first user. For instance, the techniques may make this determination based on information such as a duration of time that two users were within proximity to one another, this duration of time relative to a total duration of time that the users were in the facility together, and/or the like. For instance, the techniques may determine, for each selected time interval (as discussed above), a mean distance between a particular user and the example first user. For instance, the techniques may determine, for each of multiple times within the time interval, a location of the particular user in the facility and a location of the first user. The techniques may receive this information from the locating component and may calculate a distance therebetween. In some instances, the techniques may analyze those timestamps where each user moved relative to their previous position. That is, within the time interval, the techniques may identity those frames where the particular user moved relative to a previous frame and the first user moved relative to the previous frame. The techniques may then calculate the average/mean distance between the particular user and the first user for this time interval (e.g., for the times where the users were deemed to be "moving" within the facility) and compare this to a distance threshold. If the distance is less than the distance threshold, the techniques may update a count value indicating a number of time intervals that the two users were proximate to one another. This count value may then be input into a trained model that is configured to output an indication of whether the two respective users are to be deemed related to one another.

In addition, the techniques may determine a total number of selected time intervals that the particular user and the first user were in the environment together. For instance, if the techniques analyzed forty time intervals regarding the shopping session of the first user, the techniques may determine how many of those forty time intervals the particular user was also in the environment. In this example, the techniques may determine that the particular user was also in the environment for thirty of these time intervals. After determining this measure of overlap between the shopping sessions of the two users, the techniques may determine a ratio between the count value (indicating the number of time intervals that the particular user and the first user were proximate to one another) and the total number of overlapping time intervals. In this example, envision that that the particular user and the first user have a count value of twenty five-meaning that the mean distance between these users was less than the distance threshold for twenty five time intervals. In some instances, in addition to the count value (twenty five) being inputted to the trained model, this ratio (25/30) may also be inputted into the trained model. The trained model may then output, based at least in part on these inputs, an indication of whether the particular user and the first user are to be associated with one another. Thus, the trained model may be used to determine the user-user pairs (that is, which users(s) are to be associated with which other user(s) in the facility). It is to be appreciated that the trained model may be trained using labeled data or via any other known training techniques. After generating these user-user pairs, this information may also be inputted into the fusing component.

As discussed above, the fusing component may receive the initial user-cart pairs and the user-user pairs and may be configured to output final user-cart pairs. For instance, if a user-cart pair indicates that "user A" is associated with "Cart 123", and a user-user pair indicates that "user A" is associated with "user B", then the fusing component may determine and output an indication that "user A" is associated with "Cart 123" and that "user B" is associated with "Cart 123". Thus, the virtual cart (e.g., the listing of items placed into the cart during a shopping session in the facility) associated with "Cart 123" may be associated with both "User A" and "User B" in some instances. Thus, if either user exits the facility through the AC exit location, the techniques may charge the corresponding user for the cost of the items Or, in other instances, the techniques may output an indication to the user to exit via a non-AC exit location. For instance, an exit gate associated with the AC exit location may output the request, a mobile device associated with the user may output the request, and/or the like.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 associated with a system for enabling automated checkout (AC) techniques to allow users in an facility 104, such as example users 102(1) and 102(2), to enter the facility 104, pick one or more items, and exit the facility 104 without performing a manual checkout of the items. To do so, the system coupled to the facility 104 may identify an entering user and charge an account associated with the user for a cost of the picked items upon exit of the user.

As illustrated, the example facility 104 includes an AC entry location 108 and a non-AC entry location 110. While the non-AC entry location 110 may comprise a traditional, walk-through entrance to the facility 104, the AC entry location 108 may include an AC entry gate that requests that entering users provide identifying information prior to entering the gate. In the illustrated example, a user, such as user 102(1) enters through the AC entry location 108 by scanning a unique code presented on a mobile device of the user at a scanning device at the entry gate. The entry gate may provide this information to a system, such as an inventory management system discussed in the following figures, which may use this information for identifying the entering user. Of course, while this example describes identifying the user based on the user scanning an unique code presented on the mobile device, the system may additionally, or alternatively, identify the user based on voice data (e.g., the user stating his or her name), image data (e.g., image data of a face of the user), password data (e.g., an alphanumeric string), and/or any other type of data. For example, in some instances the facility 104 may include a single entry location, with user identification occurring based on image data of users entering the facility 104. In these examples, those users that have consented/requested to take part in the automatic-checkout techniques may be identified, while the system may refrain from identifying other users entering the facility 104.

Returning to the illustrated example, upon the example user 102(1) entering the facility via the AC entry location 108, the system generates a record indicating the presence of the identified user 102(1) within the facility. This record may be continuously or periodically updated by a user-location component of the system to generate current location data of the user within the facility, at the prior consent/request of the user 102(1). In some instances, the facility 104 includes sensors, such as overhead cameras 118(1) and 118(2) or the like, that are used to determine the current location of the user 102(1). In addition, the record generated by the system upon entry of the user 102(1) may indicate whether the user 102(1) is eligible to engage in the AC techniques provided by the facility. For example, the record may indicate whether the user 102(1) is able to "just walk out" with any items he or she collects within the facility without first performing a manual checkout for the items. In this example, at least in part because the system has identified the user 102, the user 102(1) is initially eligible to exit the facility with item(s) without performing manual checkout of any items placed into a cart 106 operated by the user 102(1). In some instances, the system may, additionally or alternatively to the user being identified, store an indication that the user is eligible to exit the facility without performing manual checkout of the items based on the user being associated with a payment instrument. For example, upon identifying the user entering the facility, the system may identify an account of the user and may determine whether the account is associated with a valid payment instrument. If so, then the system may store an indication that the user is eligible to exit the facility with one or more items without performing a manual checkout of the items. In another example, the entering user 102(1) may swipe, scan, or otherwise provide identifying information associated with a payment instrument of the user upon entering the facility. This system may use this identifying information to determine whether the payment instrument is valid (potentially along with a limit of the payment instrument) and may store an indication that the user is eligible to exit the facility without performing manual checkout of the items (assuming the total of the items is less than the limit). In these instances, the system may or may not identify the user 102(1) but may instead simply associate the user in the facility with the identified payment instrument. In yet another example, the AC-enabled entry location 108 may include a device configured to accept cash, such that a user may input a certain amount of cash and remain eligible for exiting the facility without performing a manual exit so long as the user does not obtain items having a cumulative value (e.g., with taxes, etc.) that exceeds the amount of inserted cash.

As illustrated, in this example the user 102(1) enters the facility 104 and proceeds to an AC-enabled inventory location, such as a shelf upon which one or more items 116 reside. The AC-enabled inventory location may comprise an inventory location within the facility at which result data associated with events may be determined automatically via sensor data. For example, the AC-enabled inventory location may be within the field-of-view of one or more overhead, cameras, in-shelf cameras, or the like, image data from which may be used to determine the results of events that occur at the location. In addition, or in the alternative, the inventory location may include one or more other sensors, such as in-shelf weight sensors or the like, which may generate sensor data for identifying the results of the events.

In the illustrated example, the user 102(1) removes (or "picks") an item from the AC-enabled inventory location. In response, the system may use sensor data indicative of this event to determine result data associated with this event. After doing so, the system detects this event, a result of this event, and a confidence level associated with the result. The result may comprise an indication of the action (e.g., pick, return, etc.), the identity of the item(s) involved (e.g., ketchup bottle, pair of jeans, etc.), a quantity of the item, an identity of the user, and/or additional data. The confidence level, meanwhile, may indicate a degree to which the system is confident regarding the calculated result. In some instances, the result and the confidence level may be determined using one or more classifiers previously trained using training sensor data and manually labeled results, as described further below. Furthermore, the confidence level may be compared to a threshold and, if the confidence level is greater than a threshold, then the system may update a virtual cart of the identified user based to reflect the calculated result. If, however, the confidence level is less than the threshold, then the system may perform one or more further actions for determining and/or verifying the result and may refrain from updating the virtual cart of a user.

In response to the system determining a result and an associated confidence level that is greater than the threshold, then the identified item that was determined to be picked by the user 102 is added to the virtual cart of the user. In addition, because this result was a high-confidence result, the system maintains, in the record associated with the user 102, an indication that the user 102(1) is still eligible to exit the facility without performing manual checkout of items. Stated otherwise, because the system is confident that the current virtual cart of the user is accurate, the system refrains from updating the record to indicate that the user is ineligible from exiting the facility 104 without performing a manual checkout.

At some point when the user 102(1) has acquired the items that he or she desires, the example the user 102(1) may attempt to exit the facility through an AC exit location 112. The AC exit location 112 may comprise an exit gate at which users provide identifying information for indicating to the system that the corresponding user is exiting the facility or may comprise an area of the facility that includes sensors to identify the user exiting the facility 104. In response to the user 102(1) exiting through the AC exit location 112, the system may end a shopping session of the corresponding user and charge an account of the user for the cost of the items. For example, similar to the AC entry gate, the AC exit gate may enable users to scan unique codes from their mobile phones or provide any other type of identifying information. In still other instances, users may walk out and the system may identify these users via biometric-recognition techniques, in instances where the users have so requested.

In examples where the record associated with the user 102(1) indicates that the user 102(1) is ineligible to exit through the AC exit location 112, however, the system generates and outputs, to the user 102(1), notification data indicating that the user is to exit through a non-AC exit location 114. This notification data may be output via a mobile device of the user 102, via an exit gate at the AC exit location 112, or in any other audible, visual, and/or tactile manner. As illustrated, the non-AC exit location 114 may include a POS device 148 operated by an associate 146 of the facility 104 for performing a manual checkout of any unknown items possessed by the user 102. The associate (or the user) may use the POS device 148 to scan the items in the cart 106 and charge an account for a cost of each item in the cart 106. Thereafter, the example illustrates the user exiting the facility 104 with the items. Of course, while this example shows the associate 146 performing the manual checkout at the non-AC exit location 114, in other instances the associate 146 may utilize a mobile POS device for scanning items at other locations in the facility, the user 102(1) may perform a self-checkout via a self-checkout process, or the checkout may be performed in any other manner.

Within the illustrated hybrid environment in which users may enter and exit via AC entry/exit locations or via non-AC entry/exit locations, the facility 104 may be associated with a system for determining which users in the facility 104 are associated with which carts, and which users are associated with the one another, which in turn may be used for determining associations between users and carts. For instance, this system may utilize information, such as the distance between users and carts and the distance between users to determine these associations. In the illustrated example, the user 102(1) is shown to reside, at the illustrated time, a first distance 120(1) away from the cart 106. A second user 102(2), meanwhile, is shown to reside a second distance 120(2) away from the cart 106 and a third distance 120(3) away from the first user 102(1). As introduced above and described below, the system may determine, based on these distances and other distances between the users and carts over time, that both the user 102(1) and the user 102(2) are to be associated with the cart 106. For instance the system may determine that the user 102(1) is to be associated with the cart 106 based on a consistently close distance (such as the distance 120(1)) between the user 102(1) and the cart 106. In addition, the system may determine that despite the user 102(2) being a relatively larger distance away from the cart 106 (such as the distance 120(2)) during the shopping session, that the user 102(2) is sufficiently close to the user 102(1) during the shopping session (such as the example distance 120(3)) such that the user 102(2) is to be associated with the user 102(1). Further, given that the user 102(2) is associated with the user 102(1), and that the user 102(1) is associated with the cart 106, the system may determine that the user 102(2) is also to be associated with the cart 106.

As illustrated, the cameras 118(1) and other sensors and components in the facility 104 may communicatively couple to a system composed of one or more servers 122 via one or more wired and/or wireless networks 124. The servers 122 may include one or more processors 126 and memory 128. The memory 128 may store a cart-association 130 that is configured to generate respective associations between carts and users. As illustrated, the cart-association component 130 may include a user-location component 132, a cart-location component 134, a segment-selection component 136, a cart-user component 138, a user-user component 140, and a fusing component 144. The cart-association component 130 may also include one or more datastores that store cart-user pairs 140(1) and 140(2) and user-user pairs 142. In some instances, the cart-user pairs 140(1) comprise initial pairs and the cart-user pairs 140(2) comprise final pairs determined by the fusing component 144, as described in detail below: Further, while FIG. 1 illustrates certain components, such as the user-location component 132, as being part of the cart-association component 130, it is to be appreciated that in other instances these component(s) may reside apart from the cart-association component 130, which may instead receive information generated by these components, such as the user-location component 132.

In either instances, the user-location component 132 may configure to locate user identifiers through the facility 104. For instance, upon a user, such as the user 102(1) or 102(2), scanning an identifier upon entering the facility via the AC entry location 108, the user-location component 132 may analyze sensor data generated in the facility 104 to determine a location of an identifier of the respective user over time. For instance, the user-location component 132 may analyze image data generated by the overhead cameras 118 to determine the location of the user as the user moves through the facility 104. It is to be appreciated that, as discussed above, the user-location component 132 may store respective locations-over-time of an identifier of a user in a way that does not explicitly identify the user himself or herself. These user-identifier locations may be used to determine respective distances between users and carts and users and other users, as described below.

The cart-location component 134, meanwhile, may function to determine respective locations of carts within the facility 104 as these carts move throughout the facility. For instance, the cart-location component 134 may also analyze the image data generated by the cameras 118 to determine the locations of these carts over time, such as a location of the cart 106 as the user 102(1) moves this cart 106 through the facility 104. In some instances, each cart, such as the cart 106, includes unique visual indicia (e.g., a barcode) that the cart-location component 134 may identify from the image data generated by the cameras 118, which may be used for identifying the carts and determining and storing their respective locations over time through the facility 104. In some instances, the cart-location component 134 includes a first trained classifier for identifying, from individual frames of the image data, a bounding box that encapsulates the barcode or other unique visual indicia of the cart. This portion of the frame corresponding to this bounding box may then be inputted to a second trained classifier(s) of the cart-location component 134 for "reading" the barcode or other unique visual indicia represented there. After identifying the cart from the indicia, the cart-location component 134 may store locations of the identified cart as these locations change over time. Like the user-identifier locations, these cart locations may be used to determine respective distances between users and carts, as described below. Of course, while one example is provided, the cart-location component 134 may identify a cart in any other manner. For instance, the cart-location component 134 may identify the barcode using a single classifier or using any other identification techniques. For instance, the cart-location component 134 may identify the carts using other image-recognition techniques, using RFID tags that are uniquely coupled to and associated with individual carts, and/or in any other manner.

The segment-selection component 136 may function to select time segments or intervals to analyze, such that the image analysis and other operations and calculations described herein are not performed on all of the image data generated by the cameras 118. For instance, segment-selection component 136 may select time interval to analyze every "N" units of time, such as a five-second time interval every fifteen seconds. To provide an example, envision that a shopping session of the user 102(1) begins at 9:00:00 am PST. The segment-selection component 136 may select a five-second time interval to analyze every fifteen seconds, meaning that a single time interval may be selected from: (i) 9:00:00-9:00:05 am PST: (ii) 9:00:05-9:00:10 am PST, and (iii) 9:00:10-9:00:15 am PST. In addition, a single time interval may be selected from: (i) 9:00:15-9:00:20 am PST: (ii) 9:00:20-9:00:25 am PST, and (iii) 9:00:25-9:00:30 am PST, and so forth.

In one example, the segment-selection component 136 may determine, for the user 102(1), how far the user 102(1) moved in the facility 104 within each of the three example time intervals and may select the time interval corresponding to the largest distance. For instance, if the user 102(1) is determined to have moved 3.5 meters in the first time interval, 2 meters in the second time interval, and 1 meter in the third time interval, the segment-selection component 136 may select the first time interval to analyze. In some instances, the segment-selection component 136 may determine this information from the user-location component 132. After selecting a time interval, such as 9:00:00 am PST through 9:00:05 am PST, the segment-selection component 136 may determine which camera(s) 118 in the facility 104 have a respective FOV that includes the user 102(1) during at least a portion of this time interval. For instance, the segment-selection component 136 may, again, use information from the user-location component 132 to determine a location of the particular user 102(1) during this time interval and may determine which camera(s) 118 in the facility have respective FOVs that include these location(s). The segment-selection component 136 may then acquire the image data for this time interval from these camera(s) 118. To provide an example, envision that three cameras are determined to have a respective FOV that includes a location of the user during the selected five-second interval, and that these cameras operate at thirty frames-per-second (FPS). Thus, the techniques may acquire 450 frames (150) frames from each camera corresponding to the five-second interval). The cart-location component 134 and other components of the cart-association component 130 may then use this image data (e.g., those frames) for performing their respective operations and analysis, rather than doing so upon all of the image data corresponding to the shopping session of the user 102(1).

While this example describes one process for selecting segments, it is to be appreciated that the segment-selection component 136 may select the time intervals using other techniques. For instance, the segment-selection component 136 may select a first (or other number) segment from each "N" number of time segments. For instance, every third time segment may be selected, every tenth segment, or the like. In another example, the segment-selection component 136 may select a random segment every "N" number of time segments. If, for instance, the segment-selection component 136 is to select a segment every three time intervals, the component 136 may make a random selection each three time segments. In still other instances, the segment-selection component 136 may take other information into account when making the selection, such as whether the user is near a certain section of the facility. Furthermore, it is to be appreciated that the segment-selection component 136 may utilize multiple different strategies.

The cart-user component 138 may function to analyze the information from the user-location component 132 and the cart-location component 134 to generate and store the initial cart-user pairs 140(1). For instance, the cart-user component 138 may use the locations of the user(s) in the facility 104 over time and the locations of the cart(s) in the facility 104 over time to determine distances therebetween. After computing these distances, the cart-user component 138 may determine which user(s) are to be associated with which cart(s) and may store these respective associations in the datastore(s) as the initial cart-user pairs 140(1).

For instance, the cart-user component 138 may determine, for each time interval selected by the segment-selection component 136, each user determined to be within the facility 104 during the corresponding time interval. After doing so, the cart-user component 138 may determine, from the user-location component 132, a respective location of each user during different times within the time interval. For instance, the cart-user component 138 may determine a location of the first user 102(1) at each time of the twenty times at which at which a cart 106 is associated with a particular location in the environment during the time interval. The cart-user component 138 may do the same for the second user 102(1) and for each other user determined to be within the facility 104.

After identifying these respective locations, the cart-user component 138 may compare the location of the user 102(1) with the location of the cart 106 at the first time, the location of the user 102(1) with the location of the cart 106 at the second time, and so forth. That is, at time $T_1$, the techniques may determine a difference in distance between the location of the user 102(1) at $T_1$ and the location of the cart 106 at $T_1$, a difference in distance between the location of the user 102(2) at $T_2$ and the location of the cart 106 at $T_2$, and so forth. After calculating these differences (in this example, twenty differences), the cart-user component 138 may calculate a mean difference in distance for this user 102(1) and the cart 106 and may compare this mean distance to a threshold distance, such as one meter, five meters, or the like. The cart-user component 138 may perform the same calculations for each other user in the environment, such as the user 102(2).

If the mean distance is less than the threshold distance (meaning that the cart 106 and the user 102(1) were relatively close to one another during the time interval), then the cart-user component 138 may update a count indicating a number of times that this user 102(1) was near this cart 106 for a time interval. If, for instance, this was the first time that this determination was made, the cart-user component 138 may update a count between the user 102(1) and the cart 106 from zero to one. If, for instance, this was the fifth time that this determination was made, the cart-user component 138 may update a count between the user 102(1) and the cart 106 from four to five. If, however, the mean distance is not less than the threshold distance (meaning that the user 102(1) and the cart 106 were not near each other during the time interval), then the cart-user component 138 may refrain from updating the corresponding count data.

After updating this count, the cart-user component 138 may compare the current count value to a count-value threshold to determine whether it is greater than a threshold, such as five, ten, or the like. If the count value is greater than the count-value threshold, then the cart-user component 138 may store, in the datastore 140(1), an association between the identifier associated with the user 102(1) and the identifier associated with the cart 106. Each stored association may represent a cart-user pair. Further, given that this analysis is performed on a per-user and per-cart basis, in some instances a cart may be associated with multiple users. Likewise, in some instances a user may be associated with multiple carts. Each of the determined cart-user pairs 140(1) may be inputted to the fusing component 144, which may determine and output the final cart-user pairs 140(2) as discussed in detail below.

The user-user component 140 may function to determine the user-user pairs 142, which may also be used by the fusing component 144 to generate the final cart-user pairs 140(2). For instance, the user-user component 140 may determine two (or more) users that appear, from the image data, to be shopping together and, thus, should be associated with one another as it pertains to this shopping session. For instance, the user-user component 140 may determine that the users 102(1) and 102(2) are to be associated with one another and may store such an association in the datastore 142. In some instances, the user-user component 140 may make this determination by identifying users that are proximate to one another within the facility 104 as they move throughout the facility 104.

In some instances, the user-user component 140 may analyze a location of a first user, such as the user 102(1), relative to each other user in the facility during the shopping session of the first user, such as the user 102(2) and others, to determine whether one or more other users are to be associated with the user 102(1). Using the two illustrated users 102(1) and 102(2) as an example, the user-user component 140 may make this determination based on information such as a duration of time that the two users 102(1) and 102(2) were within proximity to one another, this duration of time relative to a total duration of time that the users 102(1) and 102(2) were in the facility together, and/or the like. For instance, the user-user component 140 may determine, for each time interval selected by the segment-selection component 136, a mean distance between the user 102(1) and the user 102(2). For instance, the user-user component 140 may determine, for each of multiple times within the time, a location of the user 102(1) in the facility 104 and a location of the user 102(2). The user-user component 140 may receive this information from the user-location component 132 and may calculate a distance therebetween. In some instances, the user-user component 140 may analyze those timestamps where each user 102(1) and 102(2) moved relative to their previous position. That is, within the time interval, the user-user component 140 may identity those frames where both users 102(1) and 102(2) moved relative to a previous frame. The user-user component 140 may then calculate the average/mean distance between the user 102(1) and the user 102(2) for this time interval (e.g., for the times where the users were deemed to be "moving" within the facility) and compare this to a distance threshold. If the distance is less than the distance threshold, the user-user component 140 may update a count value indicating a number of time intervals that the two users 102(1) and 102(2) were proximate to one another. This count value may then be input into a trained model that is configured to output an indication of whether the two respective users 102(1) and 102(2) are to be deemed related to one another.

In addition, the user-user component 140 may determine a total number of selected time intervals that the user 102(1) and the user 102(2) were in the facility 104 together. For instance, if the user-user component 140 analyzed forty time intervals regarding the shopping session of the user 102(1), the user-user component 140 may determine how many of those forty time intervals the particular user was also in the facility 104. In this example, the user-user component 140 may determine that the user 102(1) was also in the facility for thirty of these time intervals. After determining this measure of overlap between the shopping sessions of the two users 102(1) and 102(2), the user-user component 140 may determine a ratio between the count value (indicating the number of time intervals that the user 102(1) and the user 102(2) were proximate to one another) and the total number of overlapping time intervals. In this example envision that the user 102(1) and the user 102(2) have a count value of twenty five-meaning that the mean distance between these users was less than the distance threshold for twenty five time intervals. In some instances, in addition to the count value (twenty five) being inputted to the trained model, this ratio (25/30) may also be inputted into the trained model. The trained model may then output, based at least in part on these inputs, an indication of whether the users 102(1) and 102(2) are to be associated with one another. Thus, the trained model may be used to determine the user-user pairs 142 (that is, which user(s) are to be associated with which other user(s) in the facility 104). It is to be appreciated that the trained model may be trained using labeled data or via any other known training techniques. After generating these user-user pairs 142, this information may also be inputted into the fusing component 144.

The fusing component 144 may receive the initial user-cart pairs 140(1) and the user-user pairs 142 and may be configured to output final user-cart pairs 140(2). For instance, if a user-cart pair 140(1) indicates that user 102(1) is associated with the cart 106, and a user-user pair 142 indicates that user 102(1) is associated with user 102(2), then the fusing component 144 may determine and output an indication that user 102(1) is associated with cart 106 and that user 102(2) is also associated with the cart 106. Thus, the virtual cart (e.g., the listing of items placed into the cart during a shopping session in the facility 104) associated with cart 106 may be associated with both users 102(1) and 102(2) in some instances. Thus, if either user exits the facility through the AC exit location 112, the system may charge the corresponding user for the cost of the items Or, in other instances, the system may output an indication to the user to exit via the non-AC exit location 114. For instance, an exit gate associated with the AC exit location 112 may output the request, a mobile device associated with the user may output the request, and/or the like.

Figure 2:
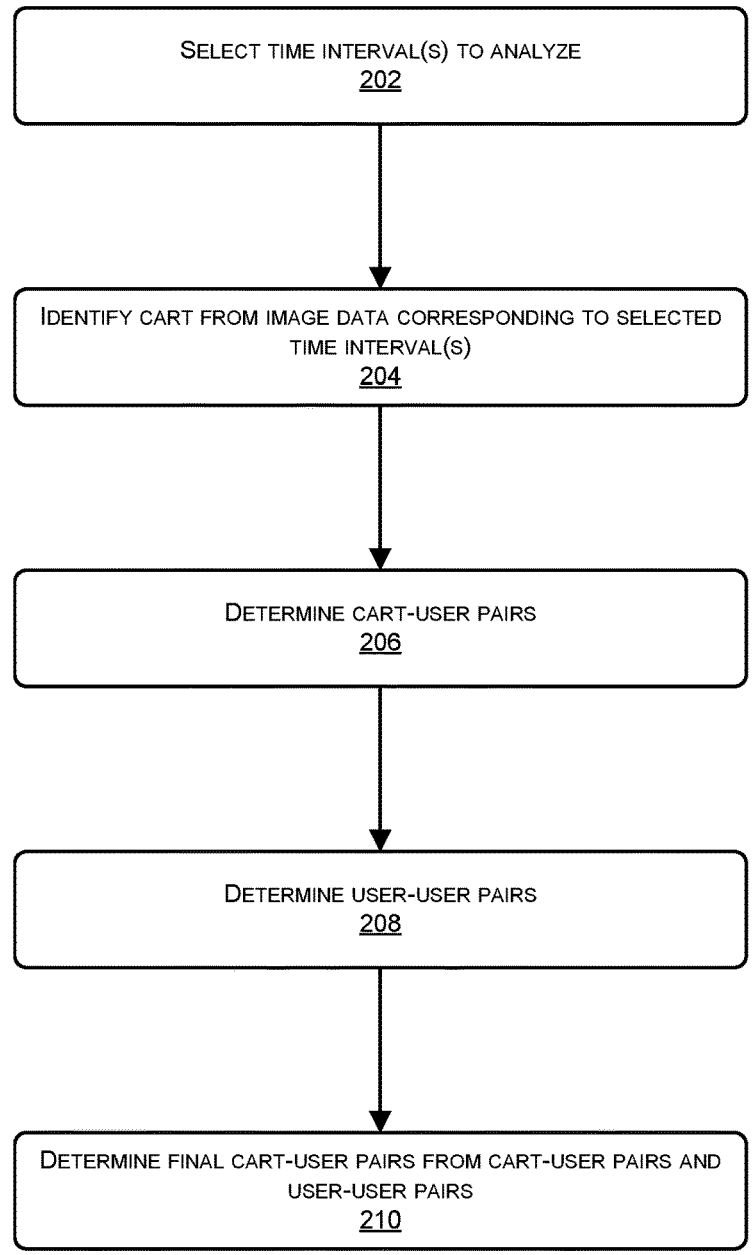
FIG. 2 illustrates a flow diagram of an example process for using sensor data (e.g., image data) generated in the facility of FIG. 1 for creating respective associations between mobile carts being operated in the facility and users in the facility. These associations may be used to, amongst other things, determine when to direct a particular user operating a particular mobile cart to exit the facility via a non-AC-exit location and when to enable a user to exit the facility with the items in the mobile cart via the AC-exit location.

FIG. 2 illustrates a flow diagram of an example process for using sensor data (e.g., image data) generated in the facility 104 for creating respective associations between mobile carts being operated in the facility and users in the facility. These associations may be used to, amongst other things, determine when to direct a particular user operating a particular mobile cart to exit the facility 104 via the non-AC-exit location 114 and when to enable a user to exit the facility 104 with the items in the mobile cart via the AC-exit location 112.

An operation 202 represents selecting one or more time intervals to analyze. In some instances, the segment-selection component 136 may perform this operation, which may include periodically selecting a time interval to analyze, such as selecting a time interval to analyze every "N" units of time. The segment-selection component 136 may select a time interval based on one or more criteria, such as distance traveled by a user represented in the image data.

Figure 3:
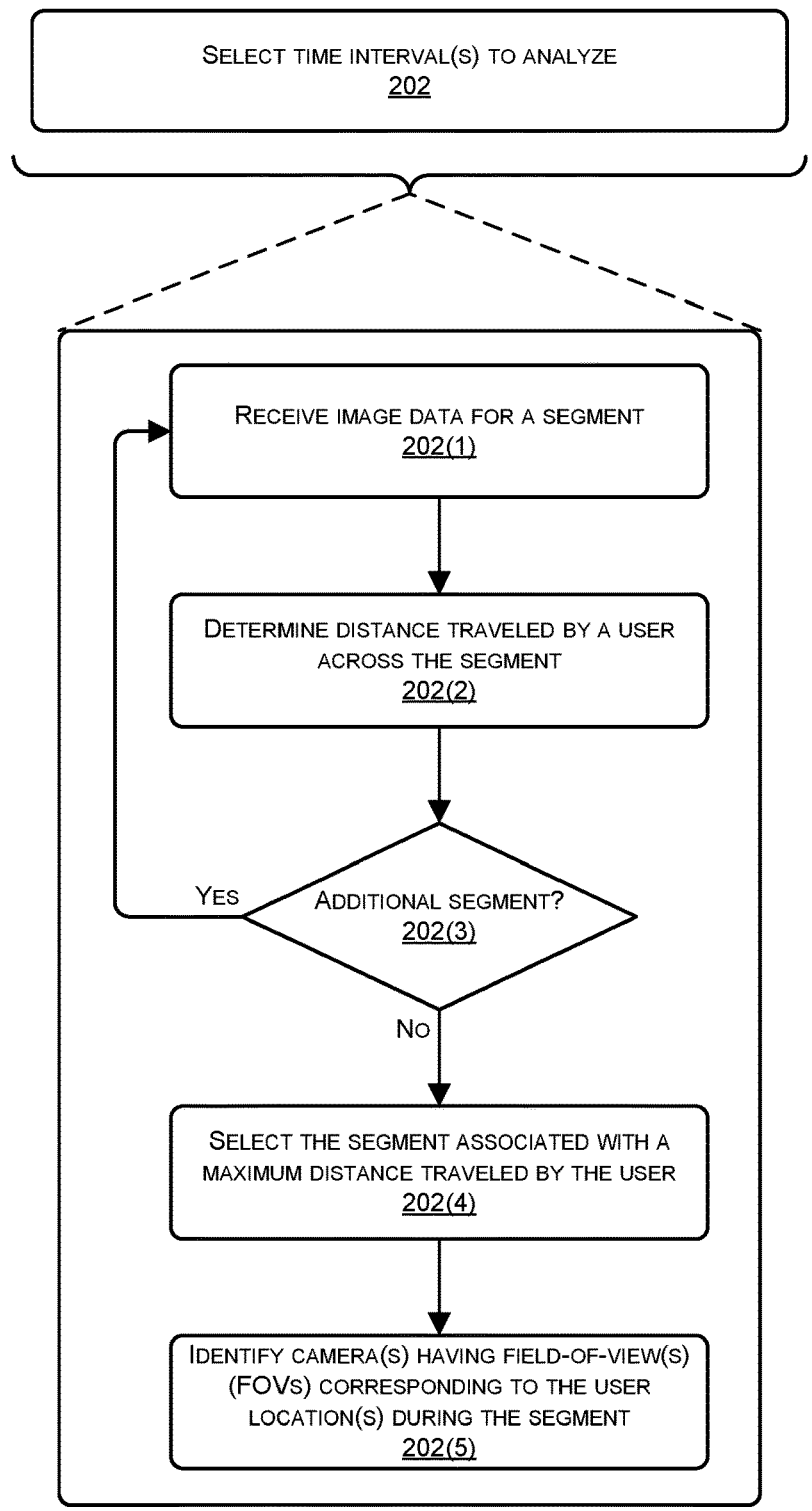
FIG. 3 illustrates sub-operations associated with an operation of the process of FIG. 2. Here, these sub-operations comprise one example manner in which the system of FIG. 1 may select one or more time intervals to analyze for creating cart-user associations.

FIG. 3 illustrates example sub-operations that the segment-selection component 136 may perform as part of the operation 202. While FIG. 3 describes one example in which the segment-selection component 136 may select time intervals to analyze, it is to be appreciated that the segment-selection component 136 may perform this selection process in other manners in other instances. Further, it is to be appreciated that, in some instances, the operations illustrated in FIG. 3 may be performed by one or more additional components other than the segment-selection component 136.

At sub-operation 202(1), the segment-selection component 136, or another component such as the user-location component 132, may receive image data for a segment. such as image data for a particular five-second segment in the facility 104. At sub-operation 202(2), the component may analyze the image data to determine the distance traveled by a user represented in the image data. For instance, these sub-operations may comprise the user-location component 132 analyzing image data to identify a user therein and to store respective locations associated with an identifier of the user over time as the user moves throughout the facility during this time interval. Based on these locations during the time interval, the user-location component 132 or the segment-selection component 136 may determine the distance traveled by the user during the five-second interval, for example.

A sub-operation 202(3) represents determining whether there is an additional segment to analyze prior to selecting a time interval. For instance, if the segment-selection component 136 is configured to select a five-second time interval every fifteen seconds, then the segment-selection component 136 may determine whether it is to analyze a second and third segment prior to making a selection amongst the three time intervals.

Upon determining the respective distances traveled by the user within the number (e.g., three) of time intervals analyzed, a sub-operation 202(4) represents selecting the segment associated with a maximum distance traveled by the user. That is, the segment-selection component 136 may determine which of the three or other number of time intervals is associated with a greatest distance traveled by the user during these intervals and may select this corresponding time interval to analyze. A sub-operation 202(5) represents the segment-selection component 136 identifying one or more cameras within the facility 104 corresponding to a location of the user during the selected time interval or segment. That is, the segment-selection component 136 may determine which camera(s) include an FOV that includes the user during at least a portion of the selected time interval and the segment-selection component 136 may request the image data for this time range from the determined camera (s).

Returning to FIG. 2, an operation 204 represents identifying a cart from the image data corresponding to the selected time interval. In some instances, the cart-location component 134 may perform this operation using the image data acquired as part of the operation 202.

Figure 4:
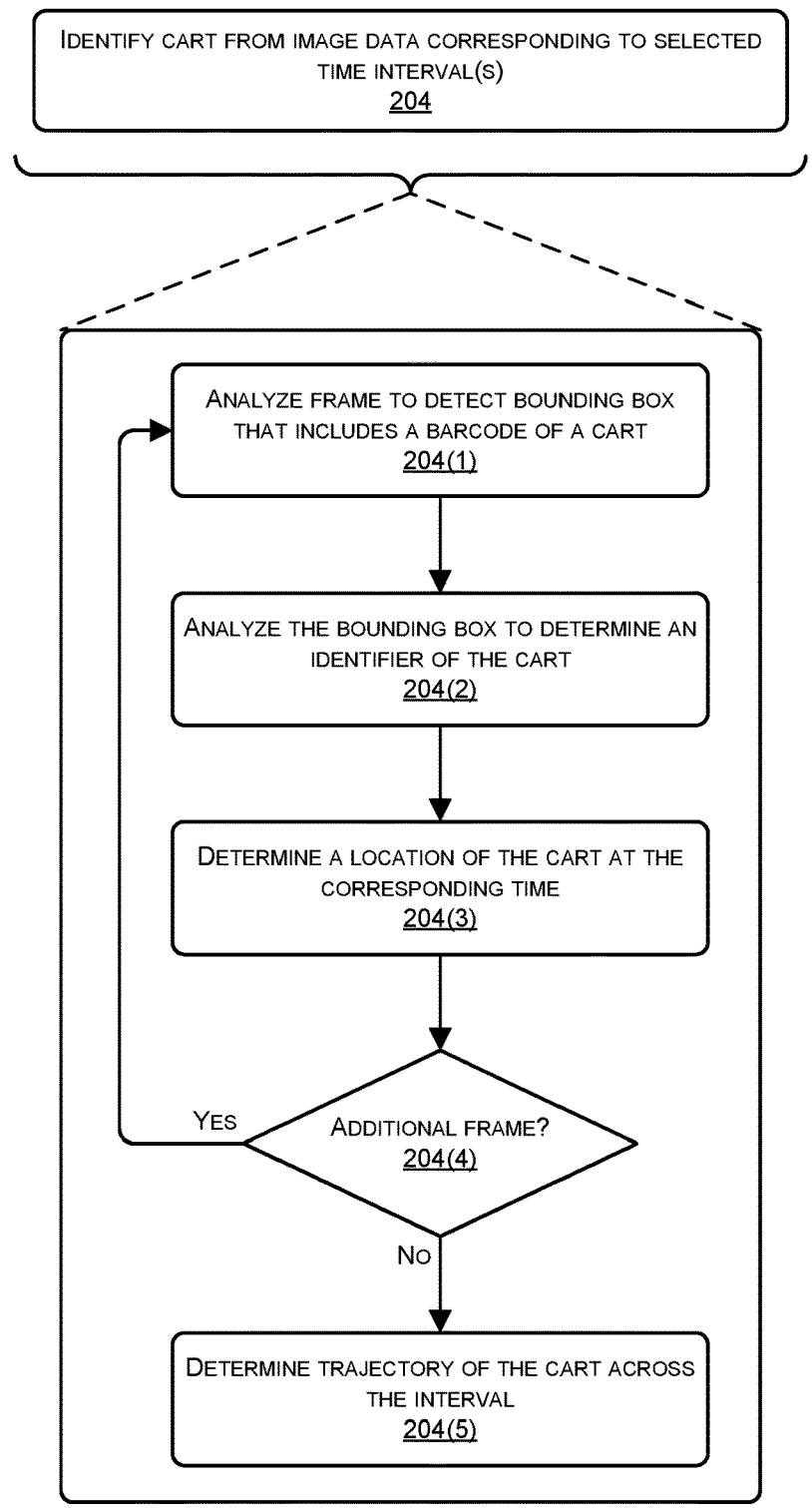
FIG. 4 illustrates sub-operations associated with another operation of the process of FIG. 2. Here, these sub-operations comprise one example manner in which the system of FIG. 1 may identify respective mobile carts as part of creating cart-user associations.

FIG. 4 illustrates example sub-operations that the cart-location component 134 may perform as part of the operation 204. While FIG. 4 describes one example process by which the cart-location component 134 may determine the location of a cart over time, it is to be appreciated that the cart-location component 134 may determine this location in other manners in other instances. Further, it is to be appreciated that, in some instances, the operations illustrated in FIG. 4 may be performed by one or more additional components other than the cart-location component 134.

At sub-operation 204(1), the cart-location component 134 may analyze a frame of the acquired image data to detect a bounding box that includes a barcode or other unique visual indicia that identifies a cart relative to other carts in the facility. In some instances, this sub-operation may comprise inputting the frame of image data to a first trained classifier configured to identify a portion of the frame that includes the barcode or other visual indicia. The first trained classifier may then output the coordinates of this portion of the frame.

At sub-operation 204(2), the cart-location component 134 may then analyze these coordinates corresponding to the bounding box to determine a unique identifier associated with the cart. For instance, one or more second trained classifiers may receive this portion of the frame of image data and may determine the value of the barcode or other visual indicia, such as a string of alphanumeric characters that uniquely identifies the cart.

At sub-operation 204(3), the cart-location component 134 may then determine location of the cart at a time corresponding to the frame of image data. That is, the cart-location component 134 may use information such as the known location of the camera that generated the frame of image data and the location of the barcode or other visual indicia in the frame of image data to determine a location of the cart (e.g., an X, Y location) at the time corresponding to a timestamp associated with the image-data frame. The cart-location component 134 may then store this cart location in association with the identifier of the cart.

A sub-operation 204(4) represents determining whether there is another frame of image data from the acquired image data corresponding to the selected time interval to analyze. If so, the process returns to the sub-operation 204(1). Upon analyzing each frame, however, the process proceeds to the operation 204(5), which comprises the cart-location component 134 determining the trajectory of the cart across the selected time interval. This sub-operation may comprise the cart-location component 134 determining movement of the cart over the time interval based on the respective locations determined at the respective frames of the acquired image data.

Returning to FIG. 2, an operation 206 represents determining initial cart-users pairs based on the respective locations of the users and the carts within the facility over time. In some instances, the cart-user component 138 may perform this operation.

Figure 5:
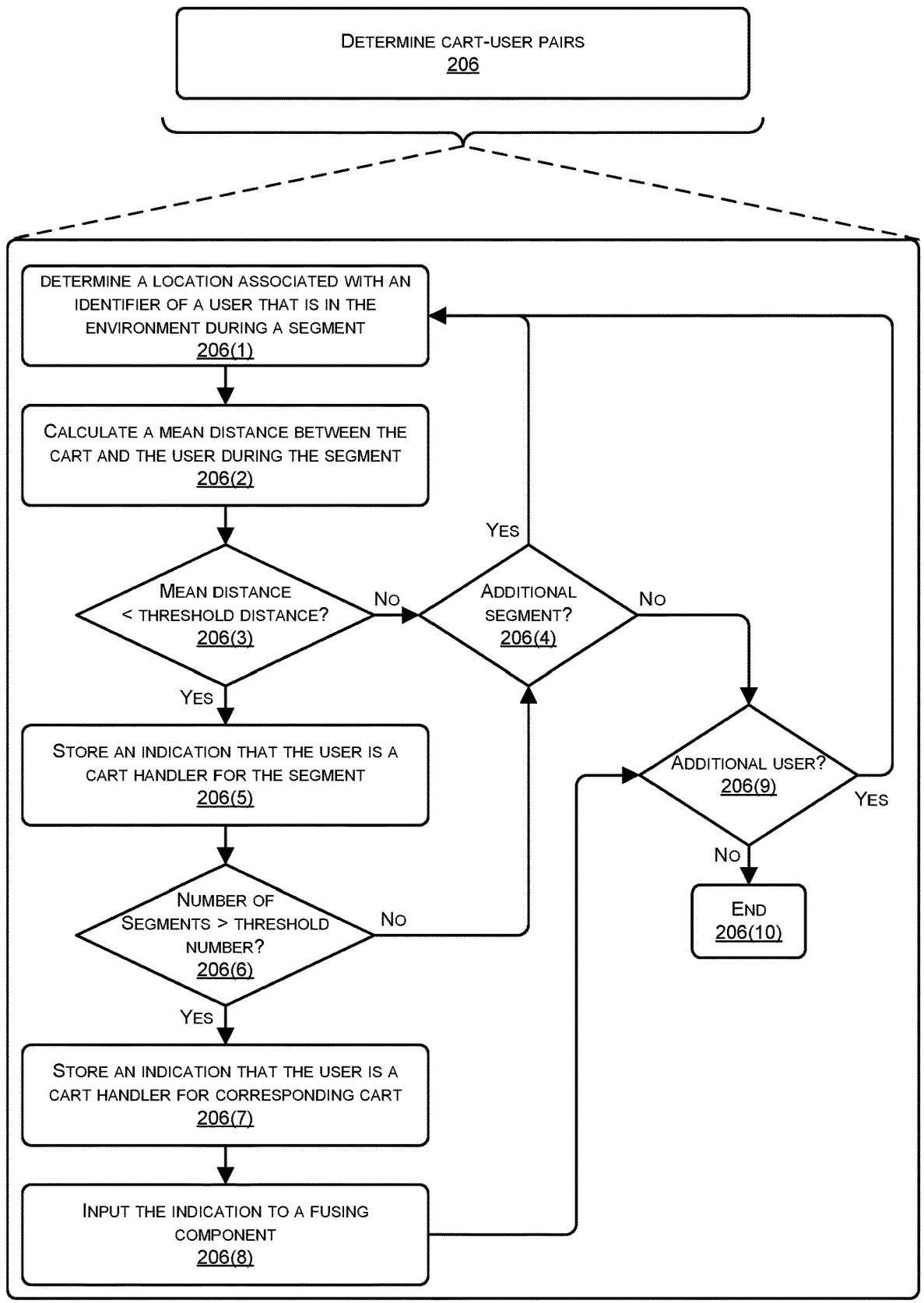
FIG. 5 illustrates sub-operations associated with another operation of the process of FIG. 2. Here, these sub-operations comprise one example manner in which the system of FIG. 1 may determine an initial set of cart-user pairs as part of creating final cart-user associations.

FIG. 5 illustrates example sub-operations that the cart-user component 138 may perform as part of the operation 206. While FIG. 5 describes one example process by which the cart-user component 138 may generate candidate cart-user pairs, it is to be appreciated that the cart-user component 138 may generate these pairs in other manners in other instances. Further, it is to be appreciated that, in some instances, the operations illustrated in FIG. 5 may be performed by one or more additional components other than the cart-user component 138.

At sub-operation 206(1), the cart-user component 138 determines a location associated with an identifier of a user that is in the environment, such as the facility 104, during the selected segment or time interval. This sub-operation may include determining the location of the user identifier from the user-location component 132. At a sub-operation 206(2), the cart-user component 138 may calculate a mean distance between the cart and the user during the segment. If, for instance, the cart-user component 138 is aware of ten user locations during the segment and ten cart locations at corresponding times, then the cart-user component 138 may calculate ten distances between the user and the cart at these ten times and, using these ten distances, may calculate a mean distance representing an average distance between the user and the cart over the segment.

A sub-operation 206(3) represents the cart-user component 138 determining whether the mean distance is less than a threshold distance. If not, then at a sub-operation 206(4) the cart-user component 138 refrains from storing any sort of indication between the user and the cart and instead determines whether there is another segment to analyze regarding the user and the cart. If so, the process returns to the sub-operation 206(1).

If, however, the mean distance is less than the threshold distance, then at a sub-operation 206(5) the cart-user component 138 stores an indication that the user is a "cart handler" for the corresponding cart for that selected time segment. That is, the cart-user component 138 may store an indication that, given that the user was proximate the cart during the segment, the user is to be associated with this cart for this given time segment. Thus, the cart-user component 138 may update count data indicating a number of time segments that the user has been deemed a cart handler for this particular cart.

A sub-operation 206(6) represents determining whether this count value—that is, the number of segments for which the user has been deemed a cart handler for this particular cart—is greater than a threshold number, such as five segments, ten segments, or the like. If not, then the process returns to the sub-operation 206(4) for determining whether there is an additional segment to analyze regarding this cart and user. If so, however, then a sub-operation 206(8) represents inputting an indication that this user is associated with this cart into the fusing component 144.

As illustrated, this process may repeat for additional users, as well as for additional carts. For instance, with reference to this particular cart, a sub-operation 206(9) represents determining whether there is another user to analyze with reference to this cart. If so, the process returns to the sub-operation 206(1). If not, then the process may end. Further, this process may repeat (or be implemented in parallel) for multiple carts of the facility.

Returning to FIG. 2, an operation 208 represents determining user-users pairs based on the respective locations of the users within the facility over time. In some instances, the user-user component 140 may perform this operation.

Figure 6:
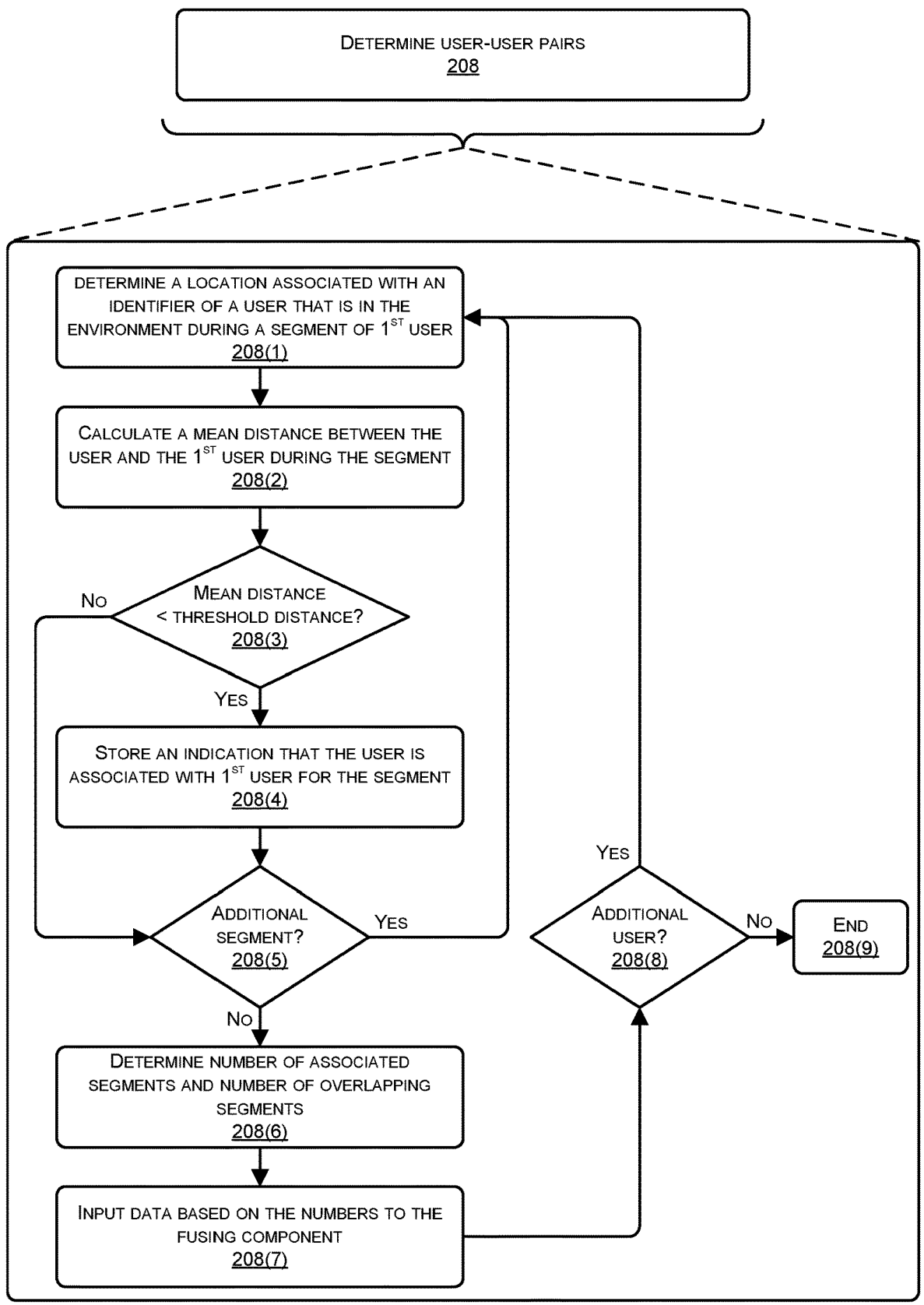
FIG. 6 illustrates sub-operations associated with another operation of the process of FIG. 2. Here, these sub-operations comprise one example manner in which the system of FIG. 1 may determine a set of user-user pairs as part of creating cart-user associations.

FIG. 6 illustrates example sub-operations that the user-user component 140 may perform as part of the operation 208. While FIG. 6 describes one example process by which the user-user component 140 may determine the user-user pairs, it is to be appreciated that the user-user component 140 may determine these pairs in other manners in other instances. Further, it is to be appreciated that, in some instances, the operations illustrated in FIG. 6 may be performed by one or more additional components other than the user-user component 140. Further, it is to be appreciated that while FIG. 6 describes the process using the first user 102(1) as the reference user, the user-user component 140 may perform the same process using other users, such as the second user 102(2), as the reference user.

At sub-operation 208(1), the user-user component 140 determines a location associated with an identifier of a user that in the environment, such as the facility 104, during the selected segment during which the user 102(1) is in the facility 104. This sub-operation may include determining the location of the user identifier from the user-location component 132. At a sub-operation 208(2), the user-user component 140 may calculate a mean distance between the user and the first user 102(1) during the segment. If, for instance, the user-user component 140 is aware of ten locations of the user during the segment and ten locations of the first user 102(1) at corresponding times, then the user-user component 140 may calculate ten distances between the user and the first user 102(1) at these ten times and, using these ten distances, may calculate a mean distance representing an average distance between the user and the first user 102(1) over the segment.

A sub-operation 208(3) represents the user-user component 140 determining whether the mean distance is less than a threshold distance. If so, then at a sub-operation 208(4) the user-user component 140 stores an indication that the user is associated with the first user 102(1) for the segment. After doing so, or if the mean distance is not less than the threshold distance, then the process proceeds to sub-operation 208(5), which comprises determining whether there is another segment to analyze regarding the user and the first user 102(1). If so, the process returns to the sub-operation 208(1).

Upon analyzing each segment in which the user and the first user 102(1) are both in the facility 104, however, the process may proceed to determine, at sub-operation 208(6), a number of segments that the user is determined to be associated with the first user 102(1) and a total number of segments that the user and the first user 102(1) are determined to have overlapped in the facility. At a sub-operation 208(7), the user-user component 140 may input information based on these numbers to the fusing component 144. For instance, if the user-user component 140 analyzed twenty total segments in which the user and the first user 102(1) were in the facility 104 together and determined that these users were associated with one another twelve times, then the user-user component 140 may input, to the fusing component 144, information based on both of these numbers (e.g., twelve and twenty). For instance, the user-user component 140 may input the number of segments during which the user was determined to be associated with the first user (twelve) and a ratio between this number and the total number of segments analyzed between these users (twelve over twenty, or 0.6).

A sub-operation 208(8) represents determining whether there is another user in the environment during the shopping session of the first user 102(1) for performing the process with reference to the other user. This sub-operation may also represent using a user other than the first user 102(1), such as the second user 102(2), as the reference user and identifying any other users that are to be associated with the new reference user 102(2).

Returning to FIG. 2, an operation 210 represents determining final cart-user pairs from the initial cart-user pairs and the user-user pairs. In some instances, the fusing component 144 may perform this operation.

Figure 7:
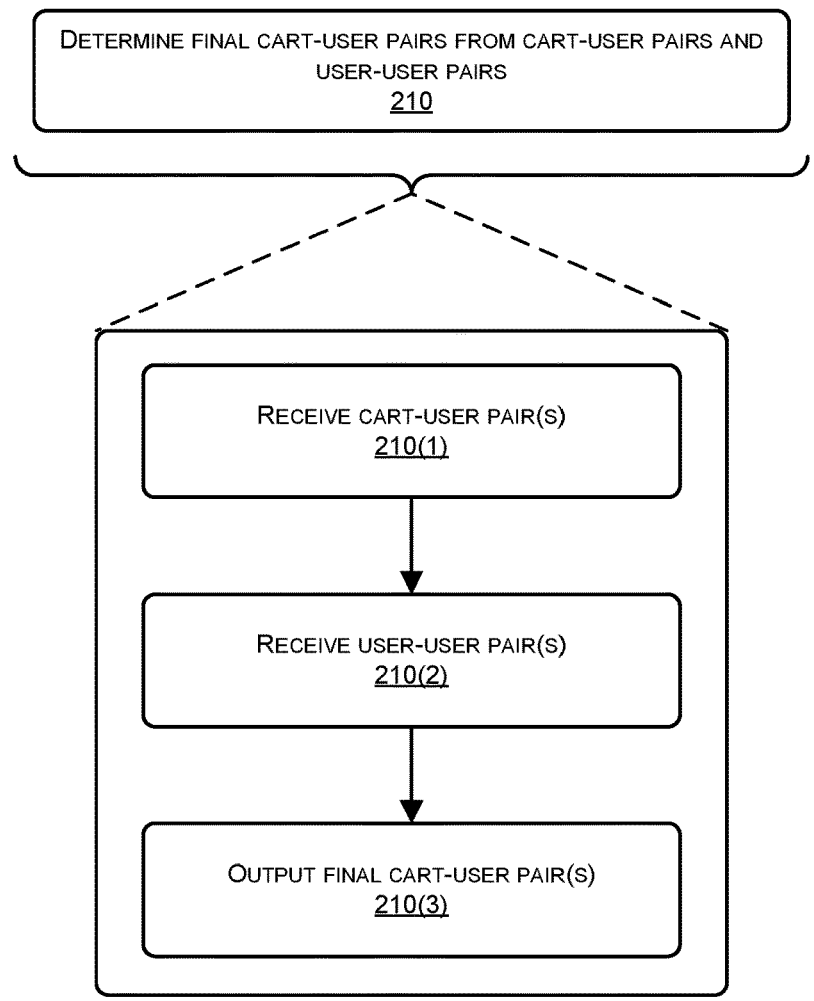
FIG. 7 illustrates sub-operations associated with another operation of the process of FIG. 2. Here, these sub-operations comprise one example manner in which the system of FIG. 1 may determine a final set of cart-user associations based on previously determined cart-user pairs and previously determined user-user pairs.

FIG. 7 illustrates example sub-operations that the fusing component 144 may perform as part of the operation 210. While FIG. 7 describes one example process by which the fusing component 144 may determine the final cart-user pairs, it is to be appreciated that the fusing component 144 may determine these pairs in other manners in other instances. Further, it is to be appreciated that, in some instances, the operations illustrated in FIG. 7 may be performed by one or more additional components other than the fusing component 144.

A sub-operation 210(1) represents the fusing component 144 receiving the initial cart-user pairs 140(1) from the cart-user component 138. These cart-user pairs may indicate one or more user identifiers that are associated with each of multiple cart identifiers. For instance, these pairs may indicate that the user 102(1) is associated with the cart 106 from FIG. 1. A sub-operation 210(2) represents the fusing component receiving the user-user pairs 142 from the user-user component 140. These pairs may indicate, for instance, that the second user 102(2) is associated with the first user 102(1). A sub-operation 210(3) comprises determining and outputting final cart-user pairs based on the initial cart user-pairs and on the user-user pairs. In some instances, the fusing component 144 may determine the final cart-user pairs as a combination of: (1) each cart-user pair from the initial cart-user pairs 140(1), and (2) new cart-user pairs determined by associating carts, that are associated with particular users as indicated by the initial cart-user pairs, to other users that are associated with these particular users from the user-user pairs. For instance, in this example, the fusing component 144 may determine that the final cart-user pairs 140(2) include the pairing of the cart 106 and the user 102(1), as well as the cart 106 and the user 102(2) (given that the user-user pairs 142 indicate that the user 102(2) is associated with the user 102(1) who is associated with the cart 106).

Figure 8A:
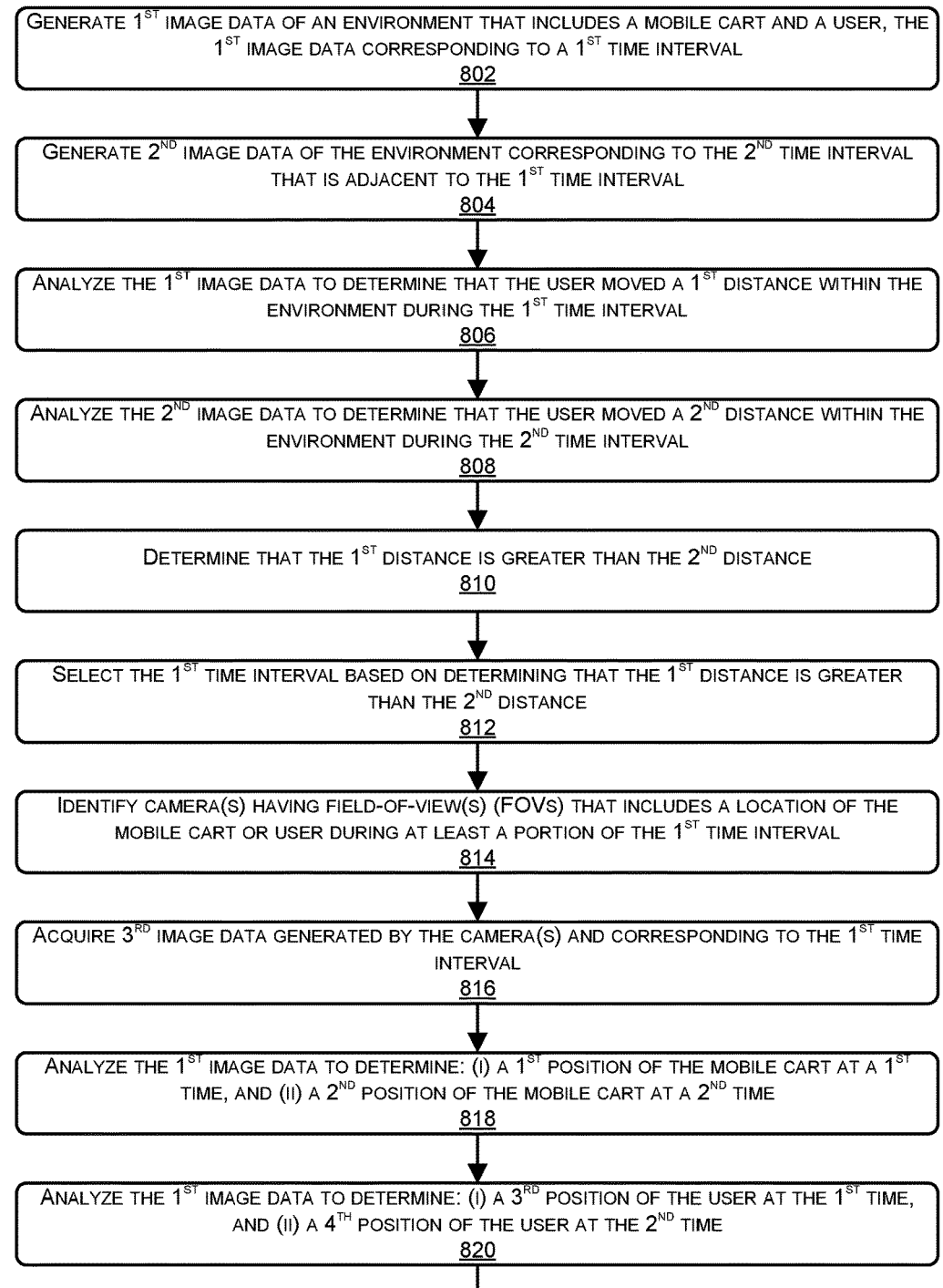
FIGS. 8A-B collectively illustrate a flow diagram of an example process for determining one or more users that are associated with a respective cart using the techniques described herein.
Figure 8B:
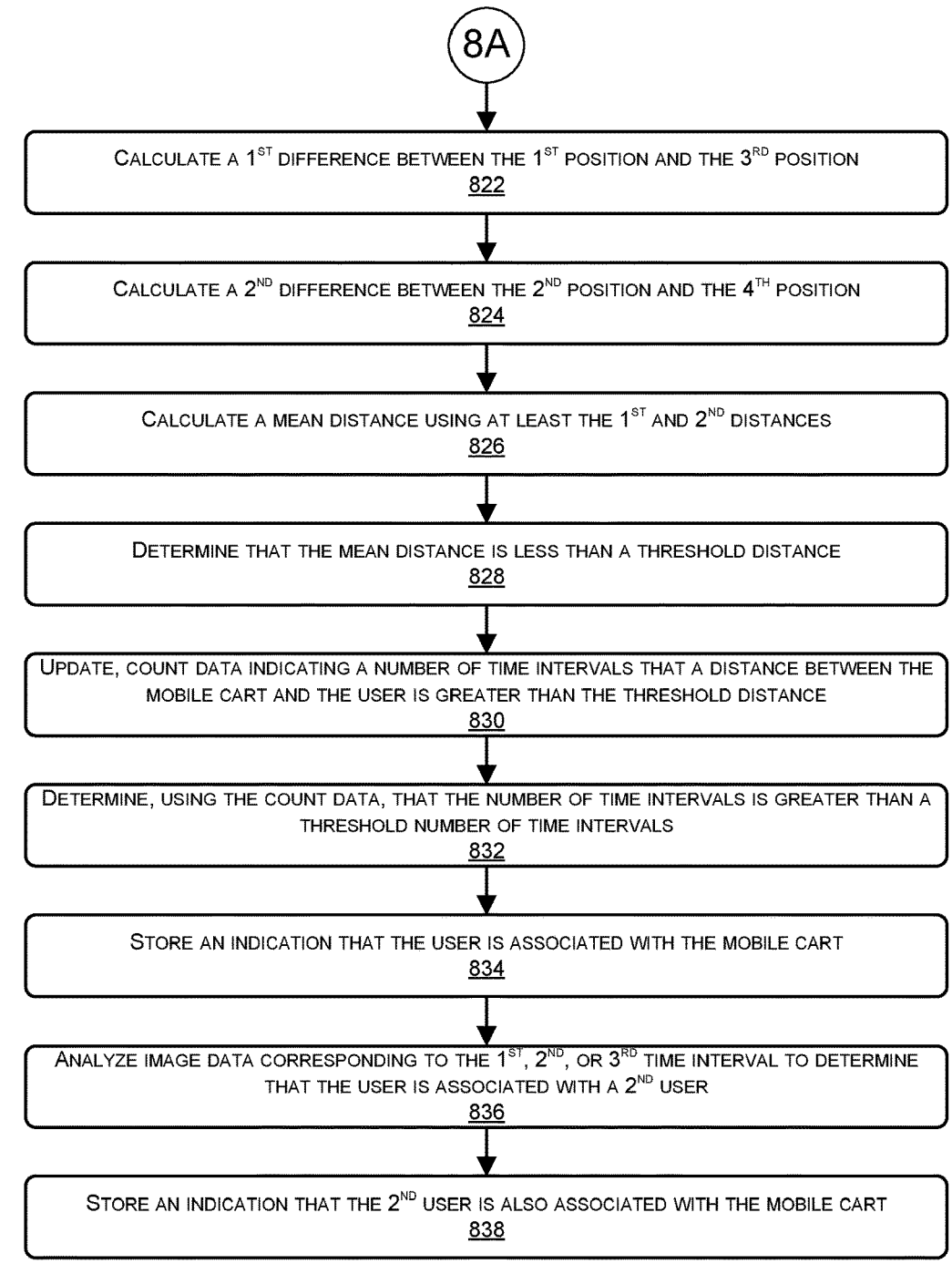

FIGS. 8A-B collectively illustrate a flow diagram of an example process 800 for determining one or more users that are associated with a respective cart using the techniques described herein. In some instances, the cart-association component 130 and/or one or more other components may perform some or all of the process 800. The process 800, and the other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

An operation 802 comprises generating first image data of an environment that includes a mobile cart and a user, the first image data corresponding to a first time interval. while an operation 804 comprises generating second image data of the environment corresponding to a second time interval that that is adjacent to the first time interval. For instance, the overhead cameras in the facility 104 may generate the first and second image data.

An operation 806 represents analyzing the first image data to determine that the user moved a first distance within the environment during the first time interval. For instance, the user-location component 132 may analyze the first image data to identify respective locations of the user during different times within the first time interval, which may be used to determine the first distance. An operation 808 represents analyzing the second image data to determine that the user moved a second distance within the environment during the second time interval. Again, the user-location component 132 may analyze the second image data to identify respective locations of the user during different times within the second time interval, which may be used to determine the second distance.

An operation 810 represents determining that the first distance is greater than the second distance and, in response, an operation 812 represents selecting the first time interval based at least in part on the determining that the first distance is greater than the second distance. An operation 814 represents identifying, based at least in part on the selecting, one or more cameras having respective field-of-views (FOVs) that include a location of at least one of the mobile cart or the user within at least a portion of the first time interval. For instance, the segment-selection component 136 may access a datastore indicating the FOVs of cameras within the facility 104 and may request image data corresponding to the first time interval that have been generated by cameras having FOVs associated with one or more locations of the user during the first time interval. An operation 816 represents acquiring third image data generated by these camera(s) and corresponding to the first time interval.

An operation 818 represents analyzing at least the first image data to determine: (i) a first position of the mobile cart at a first time during the first time interval, and (ii) a second position of the mobile cart at a second time during the first time interval. For instance, the cart-location component 134 may analyze the first image data as described above to identify at least the two different locations of the cart during the first time interval. An operation 820 represents analyzing the first image data to determine: (i) a third position of the user at the first time, and (ii) a fourth position of the user at the second time. For instance, the user-location component 132 may analyze the first image data as described above to identify at least the two different locations of the user during the first time interval.

FIG. 8B continues the illustration of the process 800 and includes, at an operation 822, calculating a first difference between the first position and the third position and, at an operation 824, calculating a second difference between the second position and the fourth position. That is, these operations may comprise the cart-user component determining the first distance between the user and the cart at the first time and the second distance between the user and the cart at the second time. An operation 826 represents calculating a mean distance using at least the first difference and the second difference. For instance, the cart-user component 138 may calculate the mean distance between the user and the cart during the first time interval using each calculated distance, which may include at least the first and second distances.

An operation 828 represents determining that the mean distance is less than a threshold distance. For instance, the cart-user component 138 may determine that the mean distance is less than ten meters, five meters, two meters, or the like. An operation 830 represents updating, at least partly in response to determining that the mean distance is less than the threshold distance, count data indicating a number of time intervals that a distance between the mobile cart and the user was less than the threshold distance. An operation 832 represents determining, using the count data, that the number of time intervals is greater than a threshold number of intervals, such as five intervals, ten intervals, or the like.

An operation 834 represents storing an indication that the user is associated with the mobile cart. For instance, the cart-user component 138 may store, based on the number of time intervals is greater than a threshold number of intervals, an indication that the user is associated with the cart. An operation 836 represents analyzing at least one of the first image data, the second image data, or third image data corresponding to a third time interval to determine that the first user is associated with a second user in the environment. For instance, the user-location component 132 and/or the user-user component 140 may analyze image data to determine that two users are to be associated with one another. An operation 838 represents storing an indication that the second user is also associated with the mobile cart based at least in part on determining that the first user is associated with the second user. For instance, the fusing component 144 may store an indication that the second user is also associated with the cart.

Figure 9A:
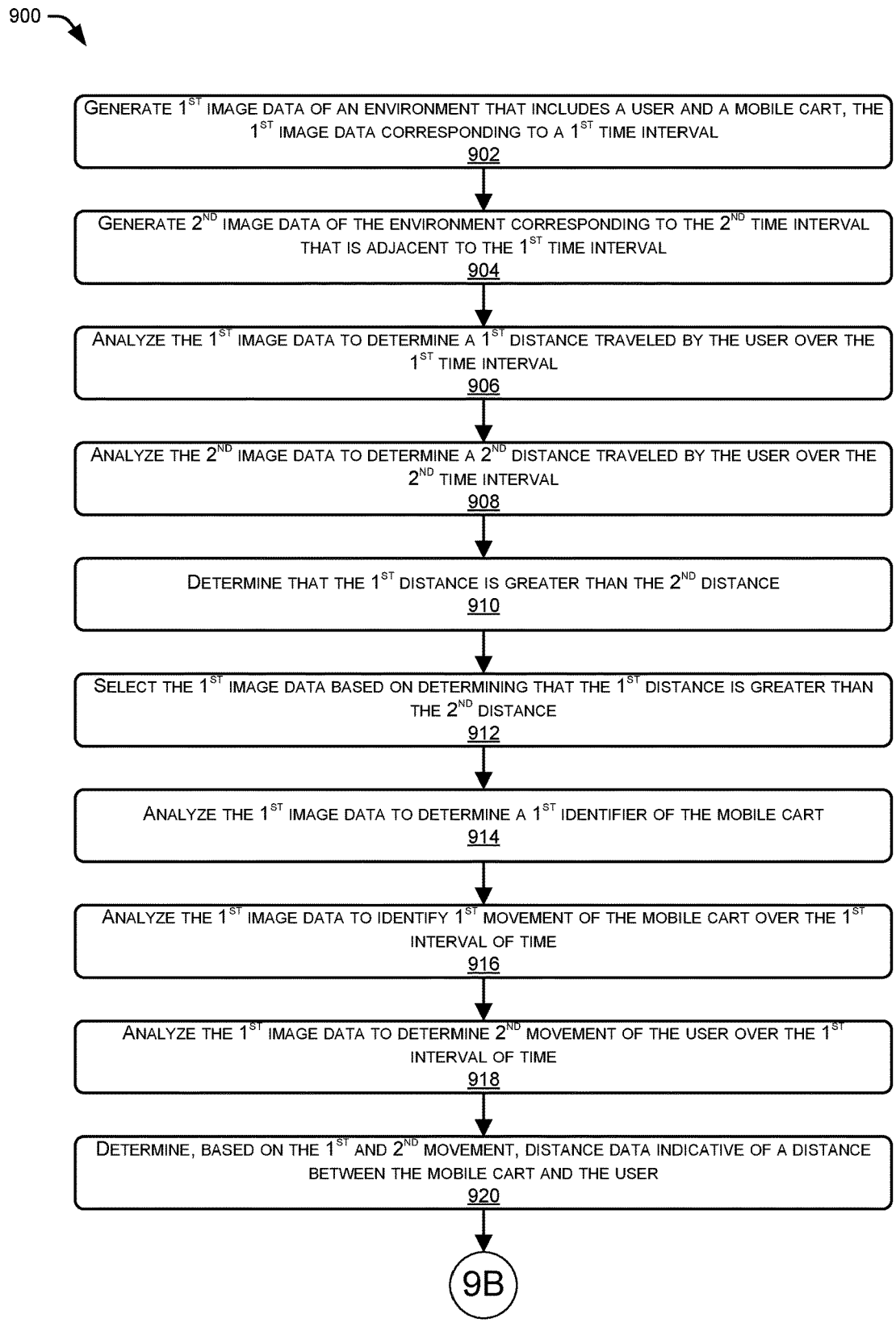
FIGS. 9A-B collectively illustrate a flow diagram of another example process for determining one or more users that are associated with a respective cart using the techniques described herein.
Figure 9B:
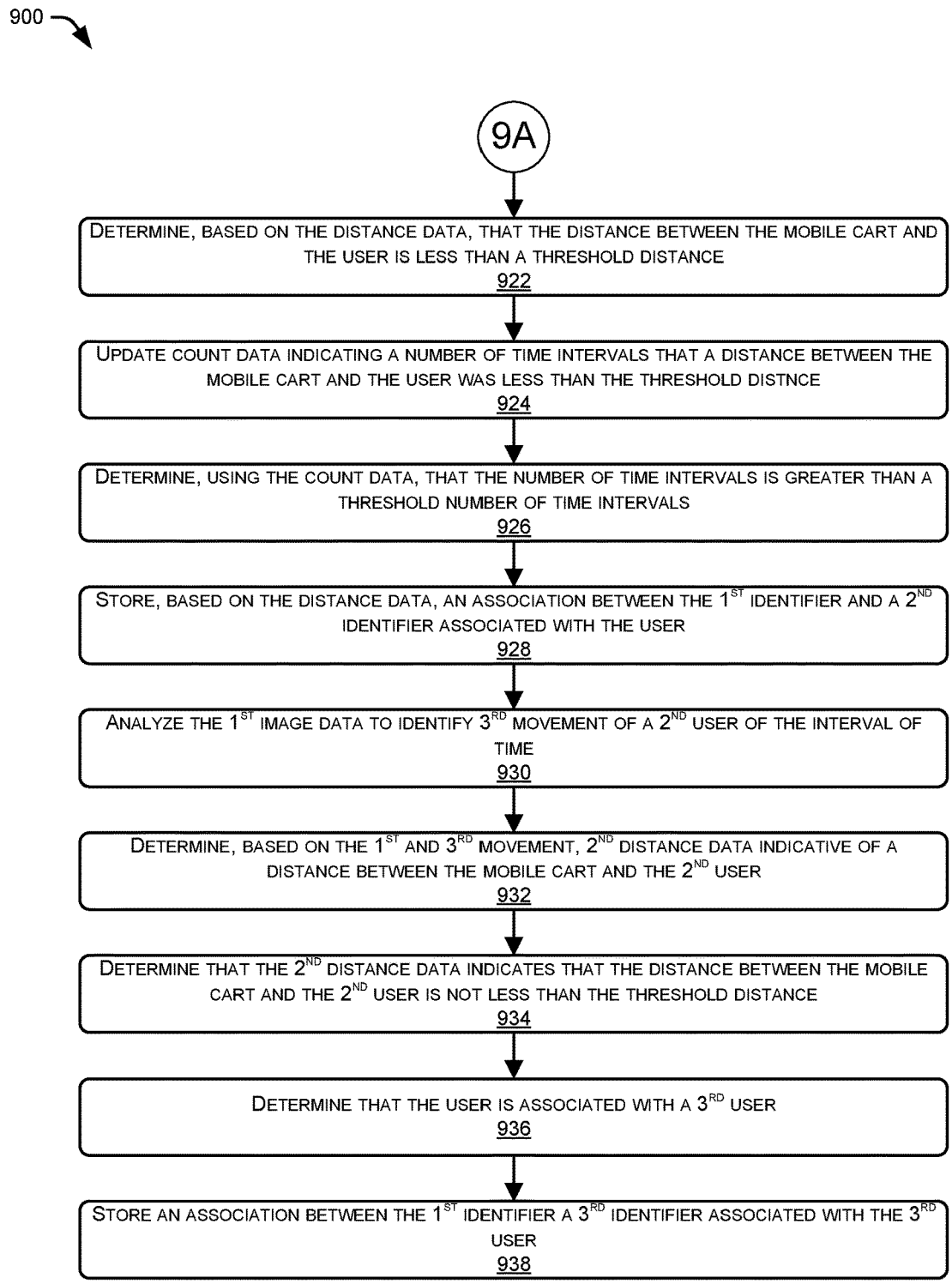

FIGS. 9A-B collectively illustrate a flow diagram of an example process 900 for determining one or more users that are associated with a respective cart using the techniques described herein. In some instances, the cart-association component 130 and/or one or more other components may perform some or all of the process 900.

An operation 902 represents generating first image data of an environment that includes at least a user and a mobile cart, the image data corresponding to first interval of time. For instance, the cameras 118 may generate the first image data. An operation 904 represents generating second image data of the environment corresponding to a second interval of time that is adjacent to the first interval of time. For instance, the cameras 118 may generate the second image data.

An operation 906 represents analyzing the first image data to determine a first distance traveled by the user over the first interval of time. For instance, the user-location component 132 may analyze the first image data to determine the first distance. An operation 908 represents analyzing the second image data to determine a second distance traveled by the user over the second interval of time. For instance, the user-location component 132 may analyze the second image data to determine the second distance. An operation 910 represents determining that the first distance is greater than the second distance and an operation 912 selecting the first image data based at least in part on the determining that the first distance is greater than the second distance.

An operation 914 represents analyzing the first image data to determine a first identifier associated with the mobile cart. For instance, the cart-location component 134 may analyze the first image data to identify a bounding box and to identify a first identifier, such as a barcode or other visual indicia, located therein. An operation 916 represents analyzing the first image data to identify first movement of the mobile cart over the first interval of time. For instance, the cart-location component 916 may determine the movement of the mobile cart based on tracking the first identifier of the cart across frames associated with the image data corresponding to the first interval of time. An operation 918 represents analyzing the first image data to determine second movement of the user over the first interval of time. In some instances, this may comprise the user-location component 132 analyzing the image data to track the user across frames of the first image data. An operation 920 represents determining, based at least in part on the first movement and the second movement, distance data indicative of a distance between the mobile cart and the user. For instance, the cart-user component 138 calculating the distance data as described above.

FIG. 9B continues the illustration of the process 900 and includes, at an operation 922, determining, based at least in part on the distance data, that the distance between the mobile cart and the user is less than a threshold distance. For instance, the cart-user component 138 may make this determination. An operation 924 represents updating count data indicating a number of time intervals that a distance between the mobile cart and the user was less than the threshold distance, while an operation 926 represents determining, using the count data, that the number of time intervals is greater than a threshold number of intervals. For instance, the cart-user component 138 may update the count data and make this determination. An operation 928 represents storing, based at least in part on the distance data, an association between the first identifier and a second identifier associated with the user. For instance, the cart-user component 138 may store, as part of cart-user pairs 140(1), an indication that the identifier user is associated with the identified cart.

An operation 930 represents analyzing the first image data to determine third movement of a second user over the first interval of time, while an operation 932 represents determining, based at least in part on the first movement and the third movement, second distance data indicative of a distance between the mobile cart and the second user. First instance, the cart-user component 138 may generate the second distance data. An operation 934 represents determining that the second distance data indicates that the distance between the mobile cart and the second user is not less than a threshold distance. For instance, the cart-user component 138 may make this determination and, thus, may refrain from generating an association between the identifier of the second user and the first identifier associated with the cart.

An operation 936 represents determining that the first user is associated with a second user in the environment. For instance, the user-user component 140 may determine, based on analyzing image data of the two users in the environment, that the first user and the second user are associated with one another. An operation 938 represents storing, based at least in part on the determining that the first user is associated with the second user, an association between the first identifier and a third identifier associated with the second user. For instance, the fusing component 144 may store this association as a final cart-user pair 142.

Figure 10:
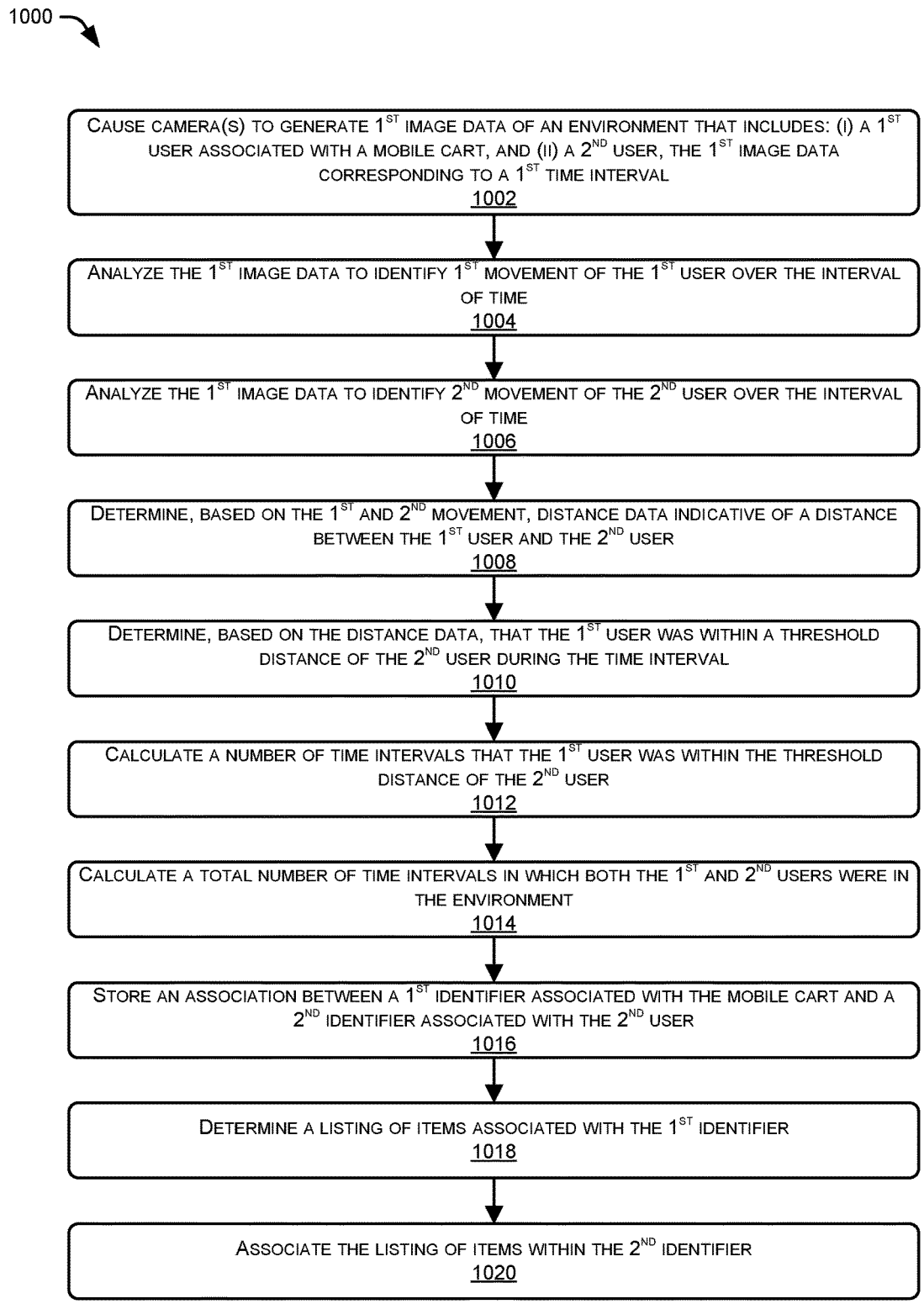
FIG. 10 illustrates a flow diagram of another example process for determining one or more users that are associated with a respective cart using the techniques described herein.

FIG. 10 collectively illustrate a flow diagram of an example process 1000 for determining one or more users that are associated with a respective cart using the techniques described herein. In some instances, the cart-association component 130 and/or one or more other components may perform some or all of the process 1000.

An operation 1002 represents causing one or more cameras to generate first image data of an environment that includes at least: (i) a first user that is associated with a mobile cart, and (ii) a second user, wherein the image data corresponds to a first interval of time. An operation 1004 represents analyzing the first image data to identify first movement of the first user over the first interval of time, while an operation 1006 represents analyzing the image data to determine second movement of the second user over the interval of time. For instance, the user-location component 132 may determine the first and second movement.

An operation 1008 represents determining, based at least in part on the first movement and the second movement, distance data indicative of a distance between the first user and the second user. For instance, the user-user component 140 may determine the distance data. An operation 1010 represents determining, based at least in part on the distance data, that the first user was within a threshold distance of the second user during the first interval of time. An operation 1012 represents calculating a number of time intervals that the first user was within the threshold distance of the second user, while an operation 1014 represents calculating a number of total time intervals in which both the first user and the second user were in the environment. For instance, the user-user component may make these determinations and, in some instances, may input this data into a trained model for determining whether respective identifiers of the first user and the second user are to be associated with one another. An operation 1016 represents storing an association between a first identifier associated with the mobile cart and a second identifier associated with the second user. For instance, the fusing component 144 may store the first identifier in association with the second identifier based on determining that the first user is associated with the mobile cart and the second user is associated with the first user.

An operation 1018 represents determining a listing of items associated with the first identifier associated with the mobile cart, while an operation 1020 represents associating the listing of items with the second identifier associated with the second user based at least in part on the storing the association between the first identifier and the second identifier. That is, given that the second user is now associated with the mobile cart, the listing of items, indicating those that have been placed into the mobile cart, may now be associated with the second user.

Figure 11:
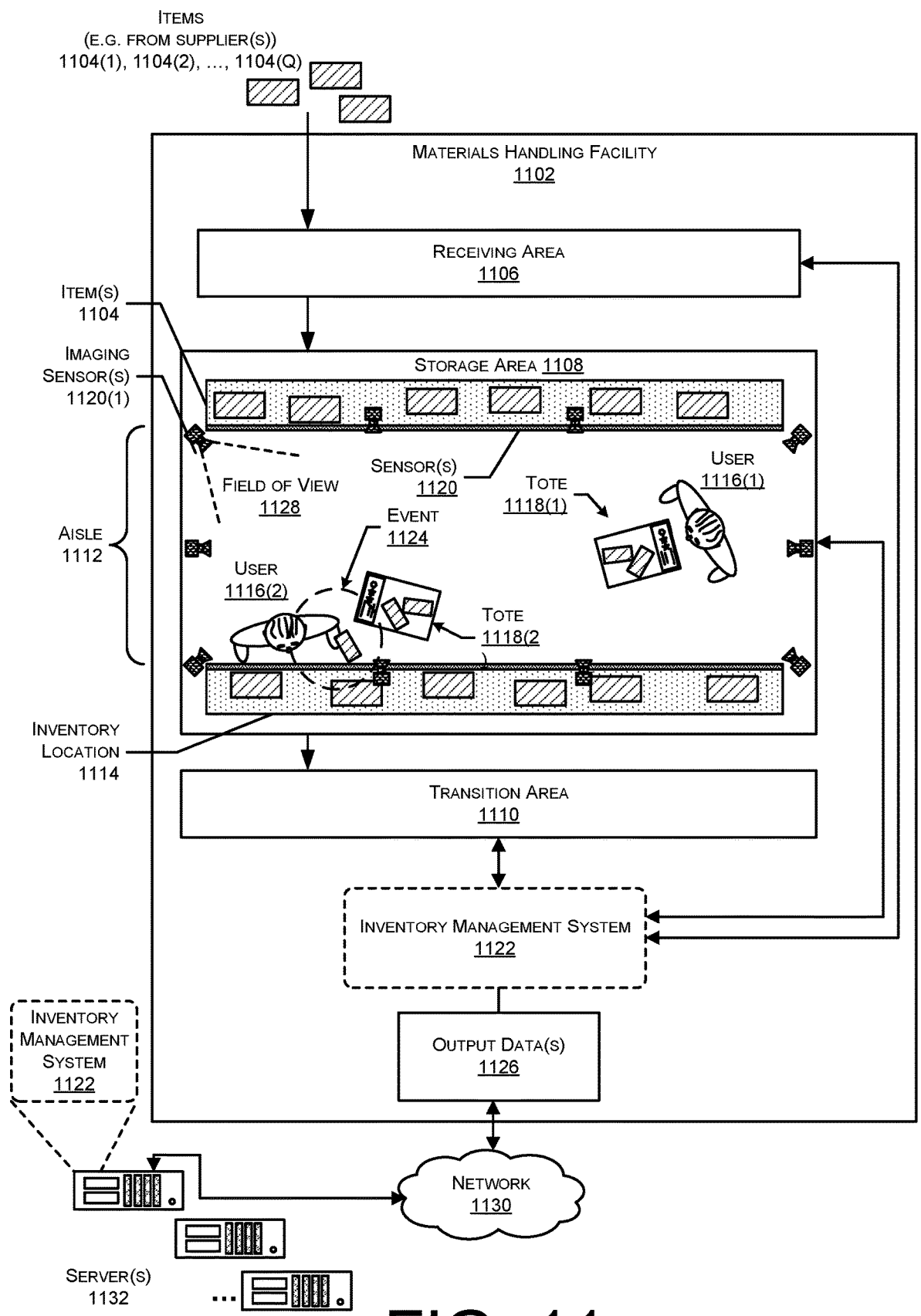
FIG. 11 is a block diagram of an example materials handling facility that includes sensors and an inventory management system configured to generate output regarding events occurring in the facility using the sensor data.
Figure 12:
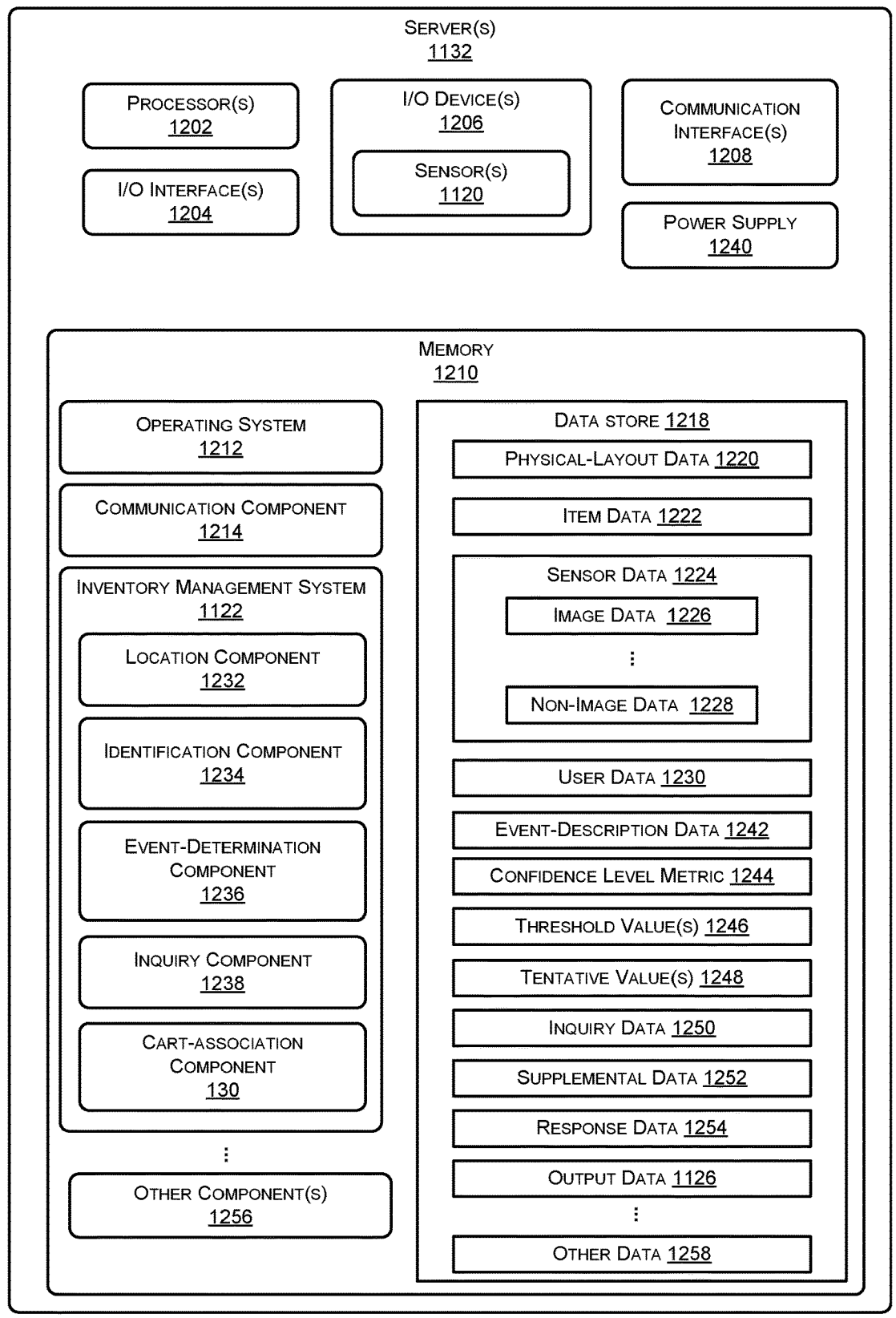
FIG. 12 illustrates a block diagram of one or more servers configured to support operation of the facility. As illustrated, the servers may include the cart-association component introduced in FIG. 1 for determining respective users to associate with respective mobile carts in the example facility of FIG. 1.

FIGS. 11 and 12 represent an illustrative materials handing environment, such as the materials handling facility 1102, in which the techniques described herein may be applied to cameras monitoring the environments as described below. However, the following description is merely one illustrative example of an industry and environment in which the techniques described herein may be utilized. The materials handling facility 1102 (or "facility") comprises one or more physical structures or areas within which one or more items 1104(1), 1104(2), ..., 1104(Q) (generally denoted as 1104) may be held. As used in this disclosure, letters in parenthesis such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one implementation, the storage area 1108 may include one or more aisles 1112. The aisle 1112 may be configured with, or defined by, inventory locations 1114 on one or both sides of the aisle 1112. The inventory locations 1114 may include one or more of shelves, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2), ..., 1116(U), totes 1118(1), 1118(2), 1118(T) (generally denoted as 1118) or other material handling apparatus may move within the facility 1102. For example, the users 1116 may move about within the facility 1102 to pick or place the items 1104 in various inventory locations 1114, placing them on the totes 1118 for ease of transport. An individual tote 1118 is configured to carry or otherwise transport one or more items 1104. For example, a tote 1118 may include a basket, a cart, a bag, and so forth. In other implementations, other agencies such as robots, forklifts, cranes, aerial drones, and so forth, may move about the facility 1102 picking, placing, or otherwise moving the items 1104.

One or more sensors 1120 may be configured to acquire information in the facility 1102. The sensors 1120 in the facility 1102 may include sensors fixed in the environment (e.g., ceiling-mounted cameras) or otherwise, such as sensors in the possession of users (e.g., mobile phones, tablets, etc.). The sensors 1120 may include, but are not limited to, cameras 1120(1), weight sensors, radio frequency (RF) receivers, temperature sensors, humidity sensors, vibration sensors, and so forth. The sensors 1120 may be stationary or mobile, relative to the facility 1102. For example, the inventory locations 1114 may contain cameras 1120(1) configured to acquire images of pick or placement of items 1104 on shelves, of the users 1116(1) and 1116(2) in the facility 1102, and so forth. In another example, the floor of the facility 1102 may include weight sensors configured to determine a weight of the users 1116 or other object thereupon.

During operation of the facility 1102, the sensors 1120 may be configured to provide information suitable for tracking how objects move or other occurrences within the facility 1102. For example, a series of images acquired by a camera 1120(1) may indicate removal of an item 1104 from a particular inventory location 1114 by one of the users 1116 and placement of the item 1104 on or at least partially within one of the totes 1118.

While the storage area 1108 is depicted as having one or more aisles 1112, inventory locations 1114 storing the items 1104, sensors 1120, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The facility 1102 may include, or be coupled to, an inventory management system 1122, which may perform some or all of the techniques described above with reference to FIGS. 2-10B. For example, the inventory management system may maintain a virtual cart of each user within the facility. The inventory management system may also store a record associated with each user indicating the identity of the user, the location of the user, and whether the user is eligible to exit the facility with one or more items without performing a manual checkout of the items. The inventory management system may also generate and output notification data to the users, indicating whether or not they are so eligible.

As illustrated, the inventory management system 1122 may reside at the facility 1102 (e.g., as part of on-premises servers), on the servers 1132 that are remote from the facility 1102, or a combination thereof. In each instance, the inventory management system 1122 is configured to identify interactions and events with and between users 1116, devices such as sensors 1120, robots, material handling equipment, computing devices, and so forth, in one or more of the receiving area 1106, the storage area 1108, or the transition area 1110. As described above, some interactions may further indicate the existence of one or more events 1124—or predefined activities of interest. For example, events 1124 may include the entry of the user 1116 to the facility 1102, stocking of items 1104 at an inventory location 1114, picking of an item 1104 from an inventory location 1114, returning of an item 1104 to an inventory location 1114, placement of an item 1104 within a tote 1118, movement of users 1116 relative to one another, gestures by the users 1116, and so forth. Other events 1124 involving users 1116 may include the user 1116 providing authentication information in the facility 1102, using a computing device at the facility 1102 to authenticate identity to the inventory management system 1122, and so forth. Some events 1124 may involve one or more other objects within the facility 1102. For example, the event 1124 may comprise movement within the facility 1102 of an inventory location 1114, such as a counter mounted on wheels. Events 1124 may involve one or more of the sensors 1120. For example, a change in operation of a sensor 1120, such as a sensor failure, change in alignment, and so forth, may be designated as an event 1124. Continuing the example, movement of a camera 1120(1) resulting in a change in the orientation of the field of view 1128 (such as resulting from someone or something bumping the camera 1120(1)) (e.g. camera 104) may be designated as an event 1124.

By determining the occurrence of one or more of the events 1124, the inventory management system 1122 may generate output data 1126. The output data 1126 comprises information about the event 1124. For example, where the event 1124 comprises an item 1104 being removed from an inventory location 1114, the output data 1126 may comprise an item identifier indicative of the particular item 1104 that was removed from the inventory location 1114 and a user identifier of a user that removed the item.

The inventory management system 1122 may use one or more automated systems to generate the output data 1126. For example, an artificial neural network, one or more classifiers, or other automated machine learning techniques may be used to process the sensor data from the one or more sensors 1120 to generate output data 1126. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 1126 or the tentative results. The automated systems may generate confidence level data that provides information indicative of the accuracy or confidence that the output data 1126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104, user 1116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominately spherical. Based on the difference in shape (cube vs. sphere) from the adjacent items, and the correspondence in shape with the previously stored image of the perfume bottle item 1104(1) (cubical and cubical), the confidence level that the user 1116 has picked up the perfume bottle item 1104(1) is high.

In some situations, the automated techniques may be unable to generate output data 1126 with a confidence level above a threshold result. For example, the automated techniques may be unable to distinguish which user 1116 in a crowd of users 1116 has picked up the item 1104 from the inventory location 1114. In other situations, it may be desirable to provide human confirmation of the event 1124 or of the accuracy of the output data 1126. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors 1120. For example, camera data such as the location of the camera 1120(1) within the facility 1102, the orientation of the camera 1120(1), and a field of view 1128 of the camera 1120(1) may be used to determine if a particular location within the facility 1102 is within the field of view 1128. The subset of the sensor data may include images that may show the inventory location 1114 or that the item 1104 was stowed. The subset of the sensor data may also omit images from other cameras 1120(1) that did not have that inventory location 1114 in the field of view 1128. The field of view 1128 may comprise a portion of the scene in the facility 1102 that the sensor 1120 is able to generate sensor data about.

Continuing the example, the subset of the sensor data may comprise a video clip acquired by one or more cameras 1120(1) having a field of view 1128 that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. A general flow of items 1104 through the facility 1102 is indicated by the arrows of FIG. 11. Specifically, as illustrated in this example, items 1104 may be received from one or more suppliers, such as manufacturers, distributors, wholesalers, and so forth, at the receiving area 1106. In various implementations, the items 1104 may include merchandise, commodities, perishables, or any suitable type of item 1104, depending on the nature of the enterprise that operates the facility 1102. The receiving of the items 1104 may comprise one or more events 1124 for which the inventory management system 1122 may generate output data 1126.

Upon being received from a supplier at receiving area 1106, the items 1104 may be prepared for storage. For example, items 1104 may be unpacked or otherwise rearranged. The inventory management system 1122 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some implementations, like items 1104 may be stored or displayed together in the inventory locations 1114 such as in bins, on shelves, hanging from pegboards, and so forth. In this implementation, all items 1104 of a given kind are stored in one inventory location 1114. In other implementations, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114. Storage of the items 1104 and their respective inventory locations 1114 may comprise one or more events 1124.

When a customer order specifying one or more items 1104 is received, or as a user 1116 progresses through the facility 1102, the corresponding items 1104 may be selected or "picked" from the inventory locations 1114 containing those items 1104. In various implementations, item picking may range from manual to completely automated picking. For example, in one implementation, a user 1116 may have a list of items 1104 they desire and may progress through the facility 1102 picking items 1104 from inventory locations 1114 within the storage area 1108, and placing those items 1104 into a tote 1118. In other implementations, employees of the facility 1102 may pick items 1104 using written or electronic pick lists derived from customer orders. These picked items 1104 may be placed into the tote 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. The transitioning may comprise one or more events 1124. Information about the transition may be maintained by the inventory management system 1122 using the output data 1126 associated with those events 1124.

In another example, if the items 1104 are departing the facility 1102 a list of the items 1104 may be obtained and used by the inventory management system 1122 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102. The purchase or rental may comprise one or more events 1124.

The inventory management system 1122 may access or generate sensor data about the facility 1102 and the contents therein including the items 1104, the users 1116, the totes 1118, and so forth. The sensor data may be acquired by one or more of the sensors 1120, data provided by other systems, and so forth. For example, the sensors 1120 may include cameras 1120(1) configured to acquire image data of scenes in the facility 1102. The image data may comprise still images, video, or a combination thereof. The image data may be processed by the inventory management system 1122 to determine a location of the user 1116, the tote 1118, the identity of the user 1116, and so forth. As used herein, the identity of the user may represent a unique identifier of the user (e.g., name, number associated with user, username, etc.), an identifier that distinguishes the user amongst other users being located with the environment, or the like.

The inventory management system 1122, or systems coupled thereto, may be configured to identify the user 1116, as well as to determine other candidate users. In one implementation, this determination may comprise comparing sensor data with previously stored identity data. For example, the user 1116 may be identified by showing their face to a facial recognition system, by presenting a token carrying authentication credentials, providing a fingerprint, scanning a barcode or other type of unique identifier upon entering the facility, and so forth. Identity of the user 1116 may be determined before, during, or after entry to the facility 1102. Determination of the user's 1116 identity may comprise comparing sensor data associated with the user 1116 in the facility 1102 to previously stored user data.

In some instances, the inventory management system group users within the facility into respective sessions. That is, the inventory management system 1122 may utilize the sensor data to determine groups of users that are effectively "together" (e.g., shopping together). In some instances, a particular session may include multiple users that entered the facility 1102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1118. Noting the child and the mother as belonging to the same session may increase the chances of successfully adding the box of cereal to the virtual shopping cart of the mother.

By determining the occurrence of one or more events 1124 and the output data 1126 associated therewith, the inventory management system 1122 is able to provide one or more services to the users 1116 of the facility 1102. By utilizing one or more human associates to process inquiry data and generate response data that may then be used to produce output data 1126, overall accuracy of the system may be enhanced. The enhanced accuracy may improve the user experience of the one or more users 1116 of the facility 1102. In some examples, the output data 1126 may be transmitted over a network 1130 to one or more servers 1132.

FIG. 12 illustrates a block diagram of the one or more servers 1132. The servers 1132 may be physically present at the facility 1102, may be accessible by the network 1130, or a combination of both. The servers 1132 do not require end-user knowledge of the physical location and configuration of the system that delivers the services. Common expressions associated with the servers 1132 may include "on-demand computing." "software as a service (SaaS)," "cloud services," "data centers," and so forth. Services provided by the servers 1132 may be distributed across one or more physical or virtual devices.

The servers 1132 may include one or more hardware processors 1202 (processors) configured to execute one or more stored instructions. The processors 1202 may comprise one or more cores. The servers 1132 may include one or more input/output (I/O) interface(s) 1204 to allow the processor 1202 or other portions of the servers 1132 to communicate with other devices. The I/O interfaces 1204 may comprise Inter-Integrated Circuit (I2C), Serial Peripheral Interface bus (SPI), Universal Serial Bus (USB) as promulgated by the USB Implementers Forum, and so forth.

The servers 1132 may also include one or more communication interfaces 1206. The communication interfaces 1206 are configured to provide communications between the servers 1132 and other devices, such as the sensors 1120, the interface devices, routers, and so forth. The communication interfaces 1206 may include devices configured to couple to personal area networks (PANs), wired and wireless local area networks (LANs), wired and wireless wide area networks (WANs), and so forth. For example, the communication interfaces 1206 may include devices compatible with Ethernet, Wi-Fi™, and so forth. The servers 1132 may also include one or more busses or other internal communications hardware or software that allow for the transfer of data between the various modules and components of the servers 1132.

The servers 1132 may also include a power supply 1240. The power supply 1240 is configured to provide electrical power suitable for operating the components in the servers 1132.

The servers 1132 may further include one or more memories 1210. The memory 1210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1210 provides storage of computer-readable instructions, data structures, program modules, and other data for the operation of the servers 1132. A few example functional modules are shown stored in the memory 1210, although the same functionality may alternatively be implemented in hardware, firmware, or as a system on a chip (SOC).

The memory 1210 may include at least one operating system (OS) component 1212. The OS component 1212 is configured to manage hardware resource devices such as the I/O interfaces 1204, the communication interfaces 1208, and provide various services to applications or components executing on the processors 1202. The OS component 1212 may implement a variant of the FreeBSD™ operating system as promulgated by the FreeBSD Project: other UNIX™ or UNIX-like variants: a variation of the Linux™ operating system as promulgated by Linus Torvalds: the Windows® Server operating system from Microsoft Corporation of Redmond, Washington, USA: and so forth.

One or more of the following components may also be stored in the memory 1210. These components may be executed as foreground applications, background tasks, daemons, and so forth. A communication component 1214 may be configured to establish communications with one or more of the sensors 1120, one or more of the devices used by associates, other servers 1132, or other devices. The communications may be authenticated, encrypted, and so forth.

The memory 1210 may store an inventory management system 1122. The inventory management system 1122 is configured to provide the inventory functions as described herein with regard to the inventory management system 1122. For example, the inventory management system 1122 may track movement of items 1104 in the facility 1102, generate user interface data, and so forth.

The inventory management system 1122 may access information stored in one or more data stores 1218 in the memory 1210. The data store 1218 may use a flat file, database, linked list, tree, executable code, script, or other data structure to store the information. In some implementations, the data store 1218 or a portion of the data store 1218 may be distributed across one or more other devices including other servers 1132, network attached storage devices, and so forth.

The data store 1218 may include physical layout data 1220. The physical layout data 1220 provides a mapping of physical locations within the physical layout of devices and objects such as the sensors 1120, inventory locations 1114, and so forth. The physical layout data 1220 may indicate the coordinates within the facility 1102 of an inventory location 1114, sensors 1120 within view of that inventory location 1114, and so forth. For example, the physical layout data 1220 may include camera data comprising one or more of a location within the facility 1102 of a camera 1120(1), orientation of the camera 1120(1), the operational status, and so forth. Continuing example, the physical layout data 1220 may indicate the coordinates of the camera 1120(1), pan and tilt information indicative of a direction that the field of view

1128 is oriented along, whether the camera 1120(1) is operating or malfunctioning, and so forth.

In some implementations, the inventory management system 1122 may access the physical layout data 1220 to determine if a location associated with the event 1124 is within the field of view 1128 of one or more sensors 1120. Continuing the example above, given the location within the facility 1102 of the event 1124 and the camera data, the inventory management system 1122 may determine the cameras 1120(1) that may have generated images of the event 1124.

The item data 1222 comprises information associated with the items 1104. The information may include information indicative of one or more inventory locations 1114 at which one or more of the items 1104 are stored. The item data 1222 may also include order data, SKU or other product identifier, price, quantity on hand, weight, expiration date, images of the ITEM 1104, detail description information, ratings, ranking, and so forth. The inventory management system 1122 may store information associated with inventory management functions in the item data 1222.

The data store 1218 may also include sensor data 1224. The sensor data 1224 comprises information acquired from, or based on, the one or more sensors 1120. For example, the sensor data 1224 may comprise 3D information about an object in the facility 1102. As described above, the sensors 1120 may include a camera 1120(1), which is configured to acquire one or more images. These images may be stored as the image data 1226. The image data 1226 may comprise information descriptive of a plurality of picture elements or pixels. Non-image data 1228 may comprise information from other sensors 1120, such as input from the microphones, weight sensors, and so forth.

User data 1230 may also be stored in the data store 1218. The user data 1230 may include identity data, information indicative of a profile, purchase history, location data, images of the user 1116, demographic data, and so forth. Individual users 1116 or groups of users 1116 may selectively provide user data 1230 for use by the inventory management system 1122. The individual users 1116 or groups of users 1116 may also authorize collection of the user data 1230 during use of the facility 1102 or access to user data 1230 obtained from other systems. For example, the user 1116 may opt-in to collection of the user data 1230 to receive enhanced services while using the facility 1102.

In some implementations, the user data 1230 may include information designating a user 1116 for special handling. For example, the user data 1230 may indicate that a particular user 1116 has been associated with an increased number of errors with respect to output data 1126. The inventory management system 1122 may be configured to use this information to apply additional scrutiny to the events 1124 associated with this user 1116. For example, events 1124 that include an item 1104 having a cost or result above the threshold amount may be provided to the associates for processing regardless of the determined level of confidence in the output data 1126 as generated by the automated system.

The inventory management system 1122 may include one or more of a location component 1232, identification component 1234, event-determination component 1236, inquiry component 1238, and the cart-association component 130, potentially amongst other components 1256.

The location component 1232 functions to locate items or users within the environment of the facility to allow the inventory management system 1122 to assign certain events to the correct users. That is, the location component 1232 may assign unique identifiers to users as they enter the facility and, with the users' consent, may locate the users throughout the facility 1102 over the time they remain in the facility 1102. The location component 1232 may perform this locating using sensor data 1224, such as the image data 1226. After a particular user enters the facility, the location component 1232 may store locations associated with an identifier of the user as the user moves within the facility 1102. As described above, the location may be stored in association with user identifiers that do not explicitly identify the user. That, each user identifier may comprise an alphanumeric string that does not include personally identifiable information (PII). In some instances, the location component 1232 may correspond, at least in part, to the user-location component 132.

In some instances, upon receiving the indication of a time and location of an event in question, the location component 1232 may query the data store 1218 to determine which one or more user identifiers were at or within a threshold distance of the location of the event at the particular time of the event. Further, the location component 1232 may assign different confidence levels to different users, with the confidence levels indicating how likely it is that each corresponding user is the user that is in fact associated with the event of interest.

The location component 1232 may access the sensor data 1224 in order to determine this location data of the user and/or items. The location data provides information indicative of a location of an object, such as the item 1104, the user 1116, the tote 1118, and so forth. The location may be absolute with respect to the facility 1102 or relative to another object or point of reference. Absolute terms may comprise a latitude, longitude, and altitude with respect to a geodetic reference point. Relative terms may include a location of 25.4 meters (m) along an x-axis and 125.2 m along a y-axis as designated by a floor plan of the facility 1102. 5.2 m from an inventory location 1114 along a heading of 169°, and so forth. For example, the location data may indicate that the user 1116(1) is 25.2 m along the aisle 1112(1) and standing in front of the inventory location 1114. In comparison, a relative location may indicate that the user 1116(1) is 32 cm from the tote 1118 at a heading of 123° with respect to the tote 118. The location data may include orientation information, such as which direction the user 1116 is facing. The orientation may be determined by the relative direction the user's 1116 body is facing. In some implementations, the orientation may be relative to the interface device. Continuing the example, the location data may indicate that the user 1116(1) is oriented with a heading of 0°), or looking north. In another example, the location data may indicate that the user 1116 is facing towards the interface device.

The identification component 1234 is configured to identify an object. In one implementation, the identification component 1234 may be configured to identify an item 1104. In another implementation, the identification component 1234 may be configured to identify the user 1116. For example, the identification component 1234 may use facial recognition techniques to process the image data 1226 and determine the identity data of the user 1116 depicted in the images by comparing the characteristics in the image data 1226 with previously stored results. The identification component 1234 may also access data from other sensors 1120, such as from an RFID reader, an RF receiver, fingerprint sensors, and so forth.

The event-determination component 1236 is configured to process the sensor data 1224 and generate output data 1126.

The event-determination component 1236 may access information stored in the data store 1218 including, but not limited to, event description data 1242, confidence levels 1244, or threshold values 1246. In some instances, the event-determination component 1236 may be configured to perform some or all of the techniques described above with regards to the event-determination component 1236. For instance, the event-determination component 1236 may be configured to create and utilize event classifiers for identifying events (e.g., predefined activity) within image data, potentially without use of other sensor data acquired by other sensors in the environment.

The event description data 1242 comprises information indicative of one or more events 1124. For example, the event description data 1242 may comprise predefined profiles that designate movement of an item 1104 from an inventory location 1114 with the event 1124 of "pick". The event description data 1242 may be manually generated or automatically generated. The event description data 1242 may include data indicative of triggers associated with events occurring in the facility 1102. An event may be determined as occurring upon detection of the trigger. For example, sensor data 1224 such as a change in weight from a weight sensor at an inventory location 1114 may trigger detection of an event of an item 1104 being added or removed from the inventory location 1114. In another example, the trigger may comprise an image of the user 1116 reaching a hand toward the inventory location 1114. In yet another example, the trigger may comprise two or more users 1116 approaching to within a threshold distance of one another.

The event-determination component 1236 may process the sensor data 1224 using one or more techniques including, but not limited to, artificial neural networks, classifiers, decision trees, support vector machines, Bayesian networks, and so forth. For example, the event-determination component 1236 may use a decision tree to determine occurrence of the "pick" event 1124 based on sensor data 1224. The event-determination component 1236 may further use the sensor data 1224 to determine one or more tentative results 1248. The one or more tentative results 1248 comprise data associated with the event 1124. For example, where the event 1124 comprises a disambiguation of users 1116, the tentative results 1248 may comprise a list of possible user 1116 identities. In another example, where the event 1124 comprises a disambiguation between items 1104, the tentative results 1248 may comprise a list of possible item identifiers. In some implementations, the tentative result 1248 may indicate the possible action. For example, the action may comprise the user 1116 picking, placing, moving an item 1104, damaging an item 1104, providing gestural input, and so forth.

In some implementations, the tentative results 1248 may be generated by other components. For example, the tentative results 1248 such as one or more possible identities or locations of the user 1116 involved in the event 1124 may be generated by the location component 1232. In another example, the tentative results 1248 such as possible items 1104 that may have been involved in the event 1124 may be generated by the identification component 1234.

The event-determination component 1236 may be configured to provide a confidence level 1244 associated with the determination of the tentative results 1248. The confidence level 1244 provides indicia as to the expected level of accuracy of the tentative result 1248. For example, a low confidence level 1244 may indicate that the tentative result 1248 has a low probability of corresponding to the actual circumstances of the event 1124. In comparison, a high confidence level 1244 may indicate that the tentative result 1248 has a high probability of corresponding to the actual circumstances of the event 1124.

In some implementations, the tentative results 1248 having confidence levels 1244 that exceed the threshold may be deemed to be sufficiently accurate and thus may be used as the output data 1126. For example, the event-determination component 1236 may provide tentative results 1248 indicative of the three possible items 1104 corresponding to the "pick" event 1124. The confidence levels 1244 associated with the possible items 1104 may be 25%, 120%, 92%, respectively. Continuing the example, the threshold result 1246 may be set such that confidence level 1244 of 90% are deemed to be sufficiently accurate. As a result, the event-determination component 1236 may designate the "pick" event 1124 as involving item 1104(3).

The inquiry component 1238 may be configured to use at least a portion of the sensor data 1224 associated with the event 1124 to generate inquiry data 1250. In some implementations, the inquiry data 1250 may include one or more of the tentative results 1248 or supplemental data 1252. The inquiry component 1238 may be configured to provide inquiry data 1250 to one or more devices associated with one or more human associates.

An associate user interface is presented on the respective devices of associates. The associate may generate response data 1254 by selecting a particular tentative result 1248, entering new information, indicating that they are unable to answer the inquiry, and so forth.

The supplemental data 1252 comprises information associated with the event 1124 or that may be useful in interpreting the sensor data 1224. For example, the supplemental data 1252 may comprise previously stored images of the items 1104. In another example, the supplemental data 1252 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1226 during presentation to an associate.

The inquiry component 1238 processes the response data 1254 provided by the one or more associates. The processing may include calculating one or more statistical results associated with the response data 1254. For example, statistical results may include a count of the number of times associates selected a particular tentative result 1248, determination of a percentage of the associates that selected a particular tentative result 1248, and so forth.

The inquiry component 1238 is configured to generate the output data 1126 based at least in part on the response data 1254. For example, given that a majority of the associates returned response data 1254 indicating that the item 1104 associated with the "pick" event 1124 is item 1104(5), the output data 1126 may indicate that the item 1104(5) was picked.

The inquiry component 1238 may be configured to selectively distribute inquiries to particular associates. For example, some associates may be better suited to answering particular types of inquiries. Performance data, such as statistical data about the performance of the associates, may be determined by the inquiry component 1238 from the response data 1254 provided by the associates. For example, information indicative of a percentage of different inquiries in which the particular associate selected response data 1254 that disagreed with the majority of associates may be maintained. In some implementations, test or practice inquiry data 1250 having a previously known correct answer may be provided to the associate for training or quality assurance purposes. The determination of the set of associates to use may be based at least in part on the performance data.

By using the inquiry component 1238, the event-determination component 1236 may be able to provide high reliability output data 1126 that accurately represents the event 1124. The output data 1126 generated by the inquiry component 1238 from the response data 1254 may also be used to further train the automated systems used by the inventory management system 1122. For example, the sensor data 1224 and the output data 1126, based on response data 1254, may be provided to one or more of the components of the inventory management system 1122 for training in process improvement. Continuing the example, this information may be provided to an artificial neural network, Bayesian network, and so forth, to further train these systems such that the confidence level 1244 and the tentative results 1248 produced in the future for the same or similar input is improved. Finally, as FIG. 12 illustrates, the servers 1132 may store and/or utilize other data 1258.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
generating first image data of an environment that includes a mobile cart and a user, the first image data corresponding to a first time interval;
generating second image data of the environment corresponding to a second time interval;
analyzing the first image data to determine that the user moved a first distance within the environment during the first time interval;
analyzing the second image data to determine that the user moved a second distance within the environment during the second time interval;
determining that the first distance is greater than the second distance;
selecting the first time interval based at least in part on the determining that the first distance is greater than the second distance;
analyzing at least the first image data to determine: (i) a first position of the mobile cart at a first time during the first time interval, and (ii) a second position of the mobile cart at a second time during the first time interval;
analyzing at least the first image data to determine: (i) a third position of the user at the first time, and (ii) a fourth position of the user at the second time;
calculating a first difference between the first position and the third position;
calculating a second difference between the second position and the fourth position;
calculating a mean distance using at least the first difference and the second difference;
determining that the mean distance is less than a threshold distance; and
storing an indication that the user is associated with the mobile cart based at least in part on the determining that the mean distance is less than the threshold distance.

2. The method as recited in claim 1, wherein the generating the first image data comprises generating the first image data using a first camera, and the method further comprises:
identifying, based at least in part on the selecting, a second camera having a field-of-view (FOV) that includes a location of at least one of the mobile cart or the user within at least a portion of the first time interval; and
acquiring third image data generated by the second camera and corresponding to the first time interval.

3. The method as recited in claim 1, further comprising:
updating, at least partly in response to determining that the mean distance is less than the threshold distance, count data indicating a number of time intervals that a distance between the mobile cart and the user was less than the threshold distance;

determining, using the count data, that the number of time intervals is greater than a threshold number of intervals;

and wherein the storing comprising storing the indication that the user is associated with the mobile cart based at least in part on the determining that the number of time intervals is greater than the threshold number of intervals.

4. The method as recited in claim 1, wherein the user comprises a first user and the method further comprises:

analyzing at least one of the first image data, the second image data, or third image data corresponding to a third time interval to determine that the first user is associated with a second user in the environment; and storing an indication that the second user is also associated with the mobile cart based at least in part on determining that the first user is associated with the second user.

5. The method as recited in claim 1, wherein the user comprises a first user, the mean distance comprises a first mean distance, and the method further comprises:

generating third image data of the environment corresponding to a third time interval;

analyzing at least the third image data to determine: (i) a fifth position of the mobile cart at a third time during the third time interval, and (ii) a sixth position of the mobile cart at a fourth time during the third time interval;

analyzing at least the third image data to determine: (i) a seventh position of a second user at the third time, and (ii) an eighth position of the second user at the fourth time;

calculating a third difference between the fifth position and the seventh position;

calculating a fourth difference between the sixth position and the eighth position;

calculating a second mean distance using at least the third difference and the fourth difference;

determining that the second mean distance is less than the threshold distance; and storing an indication that the second user is associated with the mobile cart based at least in part on the determining that the second mean distance is less than the threshold distance.

6. A method comprising:

generating image data of an environment that includes at least a user and a mobile cart, the image data corresponding to an interval of time;

analyzing the image data to determine a first identifier associated with the mobile cart;

analyzing the image data to identify movement of the mobile cart over the interval of time;

analyzing the image data to determine movement of the user over the interval of time;

determining, based at least in part on the movement of the mobile cart and the movement of the user, distance data indicative of a distance between the mobile cart and the user; and storing, based at least in part on the distance data, an association between the first identifier and a second identifier associated with the user.

7. The method as recited in claim 6, further comprising:

determining, based at least in part on the distance data, that the distance between the mobile cart and the user is less than a threshold distance;

updating count data indicating a number of intervals of time that a distance between the mobile cart and the user was less than the threshold distance;

determining, using the count data, that the number of intervals of time is greater than a threshold number of intervals of time;

and wherein the storing comprises storing the association between the first identifier and the second identifier based at least in part on the determining that the number of intervals of time is greater than the threshold number of intervals of time.

8. The method as recited in claim 6, wherein the user comprises a first user, the distance data comprises first distance data, and the method further comprises:

analyzing the image data to identify movement of a second user over the interval of time;

determining, based at least in part on the movement of the mobile cart and the movement of the second user, second distance data indicative of a distance between the mobile cart and the second user; and determining that the second distance data indicates that the distance between the mobile cart and the second user is not less than a threshold distance.

9. The method as recited in claim 6, wherein the image data comprises first image data, the interval of time comprises a first interval of time, and the method further comprises:

analyzing the first image data to determine a first distance traveled by the user over the first interval of time;

analyzing second image data of the environment corresponding to a second interval of time to determine a second distance traveled by the user over the second interval of time;

determining that the first distance is greater than the second distance; and selecting the first image data based at least in part on the determining that the first distance is greater than the second distance.

10. The method as recited in claim 6, wherein the analyzing the image data to identify the first identifier associated with the mobile cart comprises:

analyzing, by a first trained classifier, the image data to identify a bounding box within the image data that includes a visual representation of the first identifier; and analyzing, by a second trained classifier, the bounding box to identify the first identifier.

11. The method as recited in claim 6, wherein the image data comprises first image data, the interval of time comprises a first interval of time, the user comprises a first user, the distance data comprises first distance data, and the method further comprises:

generating second image data of the environment, the second image data corresponding to a second interval of time and representing at least a second user and the mobile cart;

analyzing the second image data to determine the first identifier associated with the mobile cart;

analyzing the second image data to identify movement of the mobile cart over the second interval of time;

analyzing the second image data to identify movement of the second user over the second interval of time;

determining, based at least in part on the movement of the mobile cart over the second time interval and the movement of the second user over the second time interval, second distance data indicative of a distance between the mobile cart and the second user; and storing, based at least in part on the second distance data, an association between the first identifier and a third identifier associated with the second user.

12. The method as recited in claim 6, wherein the user comprises a first user and the method further comprises:
    determining that the first user is associated with a second user in the environment; and
    storing, based at least in part on the determining that the first user is associated with the second user, an association between the first identifier and a third identifier associated with the second user.

13. The method as recited in claim 12, wherein the distance data comprises first distance data and the determining that the first user is associated with the second user comprises:
    analyzing the image data to determine movement of the second user over the interval of time;
    determining, based at least in part on the movement of the first user and the movement of the second user, second distance data indicative of a distance between the first user and the second user; and
    determining that the distance between the first user and the second user is less than a threshold distance.

14. The method as recited in claim 12, wherein the determining that the first user is associated with the second user comprises determining that the first user is associated with the second user based at least in part on: (i) a number of intervals of time that the first user was within a threshold distance of the second user, and (ii) a number of intervals of time in which both the first user and the second user were in the environment.

15. A system comprising:
    one or more processors; and
    one or more computer-readable media storing computer-executable instructions that, when executed, cause the one or more processors to perform acts comprising:
        causing one or more cameras to generate image data of an environment that includes at least: (i) a first user that is associated with a mobile cart, and (ii) a second user, wherein the image data corresponds to an interval of time;
        analyzing the image data to identify movement of the first user over the interval of time;
        analyzing the image data to determine movement of the second user over the interval of time;
        determining, based at least in part on the movement of the first user and the movement of the second user, distance data indicative of a distance between the first user and the second user; and
        storing, based at least in part on the distance data, an association between a first identifier associated with the mobile cart and a second identifier associated with the second user.

16. The system as recited in claim 15, wherein:
    the analyzing the image data to identify the movement of the first user comprises analyzing the image data to determine: (i) a first position of the first user at a first time during the interval of time, and (ii) a second position of the first user at a second time during the interval of time;
    the analyzing the image data to identify the movement of the second user comprises analyzing the image data to determine: (i) a third position of the second user at the first time, and (ii) a fourth position of the second user at the second time; and
    the computer-readable media further stores computer-executable instructions that, when executed, cause the one or more processors to perform acts comprising:
        calculating a first difference between the first position and the third position;
        calculating a second difference between the second position and the fourth position;
        calculating a mean distance using at least the first difference and the second difference;
        determining that the mean distance is less than a threshold distance;
        and wherein the storing comprises storing the association based at least in part on the determining that the mean distance is less than the threshold distance.

17. The system as recited in claim 15, wherein the computer-readable media further stores computer-executable instructions that, when executed, cause the one or more processors to perform acts comprising:
    determining, based at least in part on the distance data, that the first user was within a threshold distance of the second user during the interval of time;
    calculating a number of intervals of time that the first user was within the threshold distance of the second user;
    calculating a number of total intervals of time in which both the first user and the second user were in the environment;
    and wherein the storing comprises storing the association between the first identifier and the second identifier based at least in part on: (i) the number of intervals of time that the first user was within the threshold distance of the second user, and (ii) the number of intervals of time in which both the first user and the second user were in the environment.

18. The system as recited in claim 15, wherein the distance data comprises first distance data, and the computer-readable media further stores computer-executable instructions that, when executed, cause the one or more processors to perform acts comprising:
    analyzing the image data to identify movement of a third user over the interval of time;
    determining, based at least in part on the movement of the first user and the movement of the third user, second distance data indicative of a distance between the first user and the third user; and
    determining that the second distance data indicates that the distance between the first user and the third user is not less than a threshold distance.

19. The system as recited in claim 15, wherein the interval of time comprises a first interval of time, the image data comprises first image data, and the computer-readable media further stores computer-executable instructions that, when executed, cause the one or more processors to perform acts comprising:
    analyzing the first image data to a determine a first distance traveled by the first user over the first interval of time;
    analyzing second image data of the environment corresponding to a second interval of time to determine a second distance traveled by the first user over the second interval of time;
    determining that the first distance is greater than the second distance; and
    selecting the first image data based at least in part on the determining that the first distance is greater than the second distance.

20. The system as recited in claim 15, wherein the image data comprises first image data, the interval of time comprises a first interval of time, the distance data comprises first distance data, and the computer-readable media further stores computer-executable instructions that, when executed, cause the one or more processors to perform acts comprising:

causing the one or more cameras to generate second image of the environment, wherein the second image data corresponds to second interval of time that is prior to the first interval of time;

analyzing the second image data to determine movement of the first user over the second interval of time;

analyzing the second image data to determine movement of the mobile cart over the second interval of time;

determining, based at least in part on the movement of the first user over the second interval of time and the movement of the mobile cart over the second interval of time, second distance data indicative of a distance between the mobile cart and the first user; and storing, based at least in part on the second distance data, an association between the first identifier associated with the mobile cart and a third identifier associated with the first user.

21. The system as recited in claim 20, wherein the computer-readable media further stores computer-executable instructions that, when executed, cause the one or more processors to perform acts comprising:

determining, based at least in part on the second distance data, that the distance between the mobile cart and the first user is less than a threshold distance;

updating count data indicating a number of intervals of time that a distance between the mobile cart and the first user was less than the threshold distance;

determining, using the count data, that the number of intervals of time is greater than a threshold number of intervals of time;

and wherein the storing the association between the first identifier and the third identifier comprises storing the association between the first identifier and the third identifier based at least in part on the determining that the number of intervals of time is greater than the threshold number of intervals of time.

22. The system as recited in claim 15, wherein the computer-readable media further stores computer-executable instructions that, when executed, cause the one or more processors to perform acts comprising:

determining a listing of items associated with the first identifier associated with the mobile cart; and associating the listing of items with the second identifier associated with the second user based at least in part on the storing the association between the first identifier and the second identifier.

\* \* \* \* \*